Figure 3:
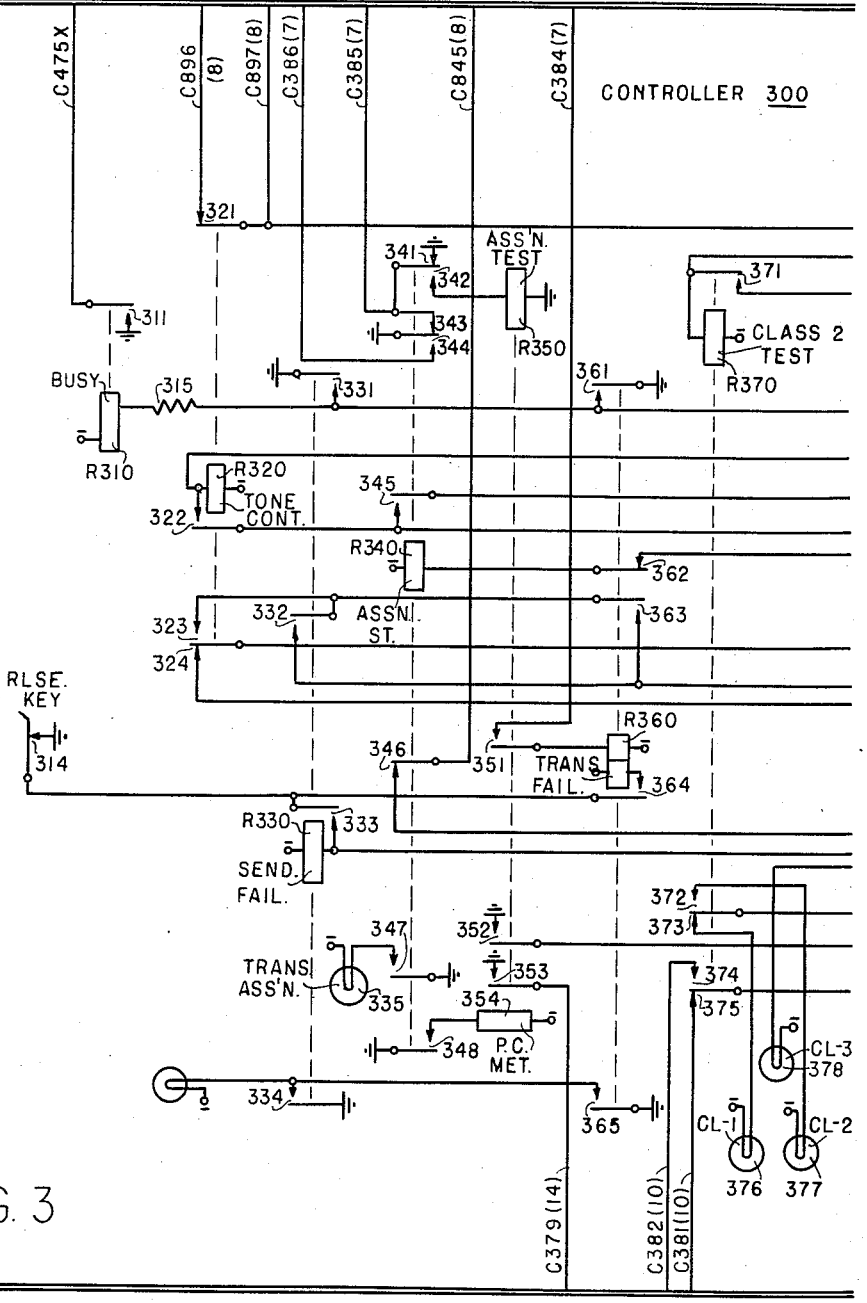
Figure 4:
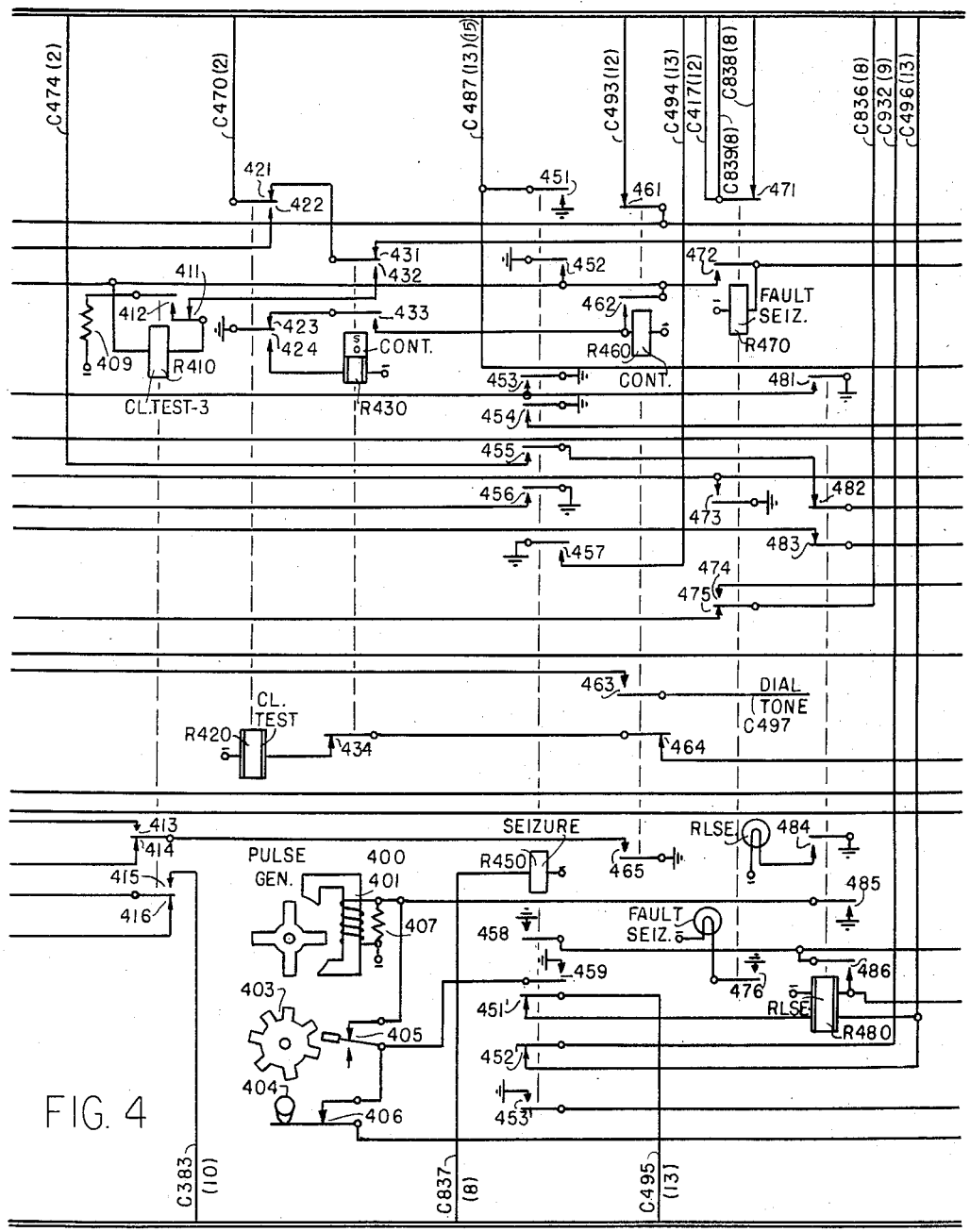

Sept. 16, 1958    A. H. FAULKNER    2,852,613
REGISTER-SENDER ARRANGEMENT
Filed Feb. 28, 1957    14 Sheets-Sheet 1
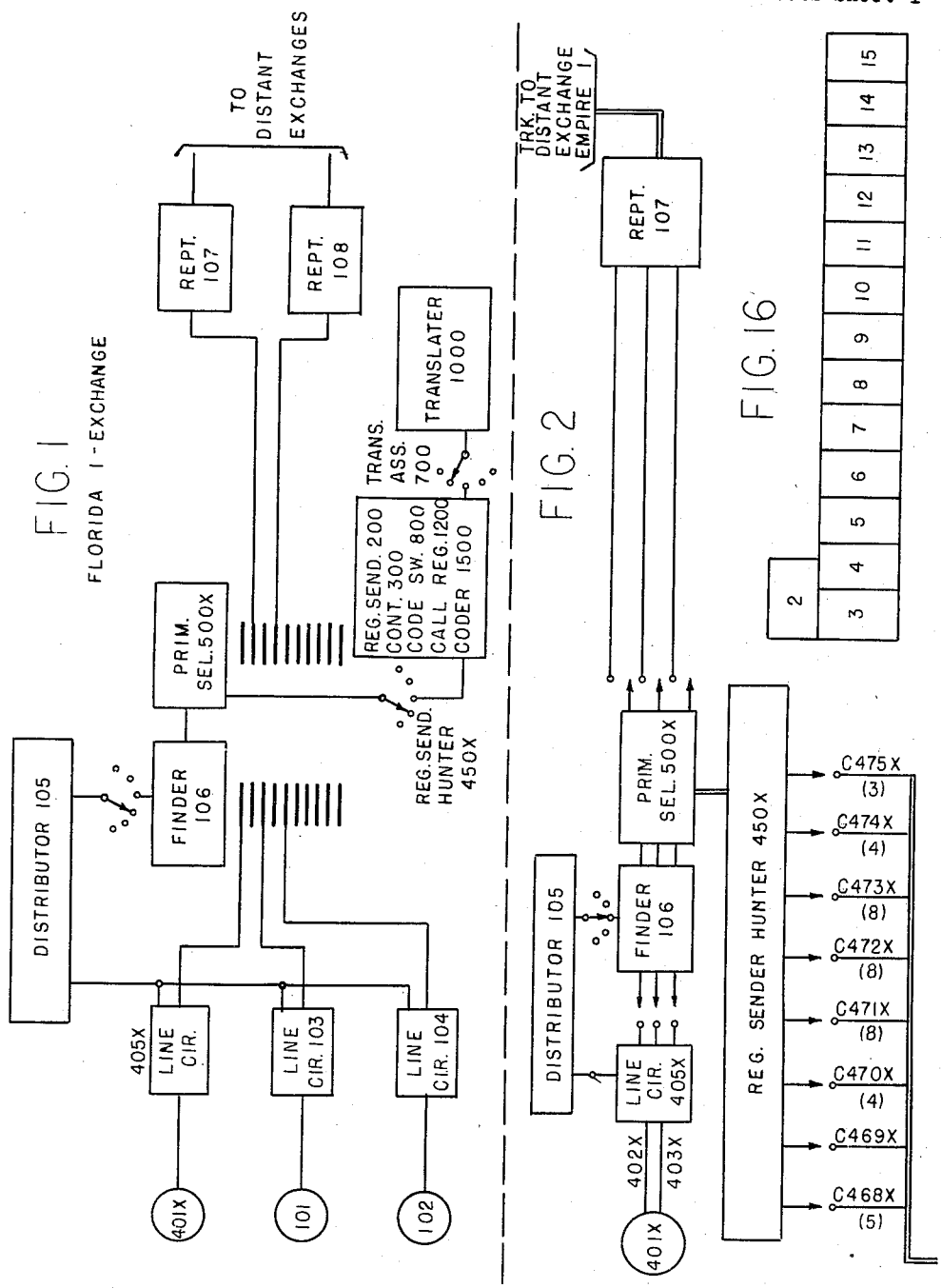
INVENTOR.
ALFRED H. FAULKNER
BY
Smith, Olsen, Baird and Miller
ATTYS.

INVENTOR.
ALFRED H. FAULKNER
ATTYS

CODE SW.
800

INVENTOR.
ALFRED H. FAULKNER

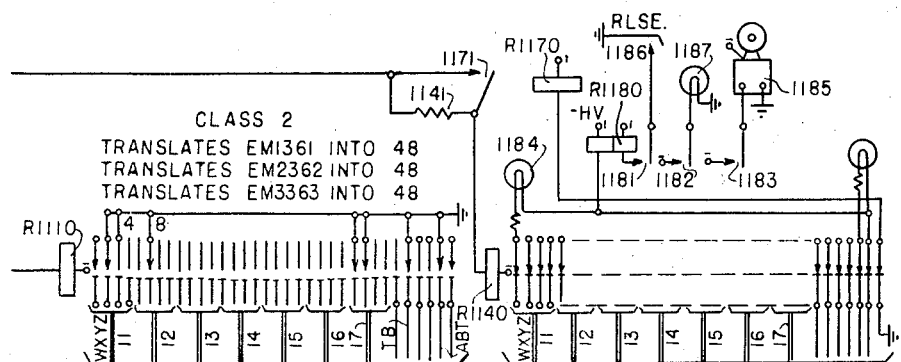
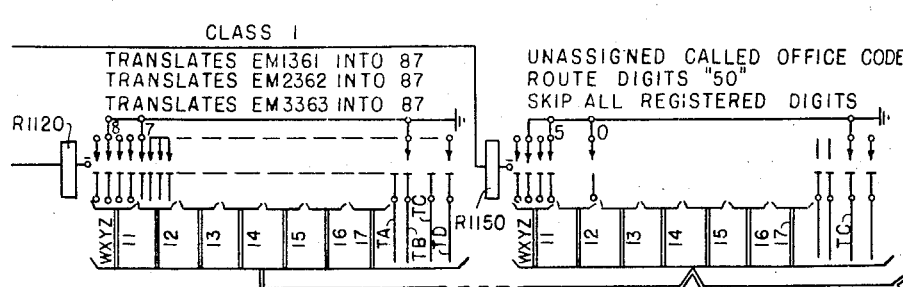
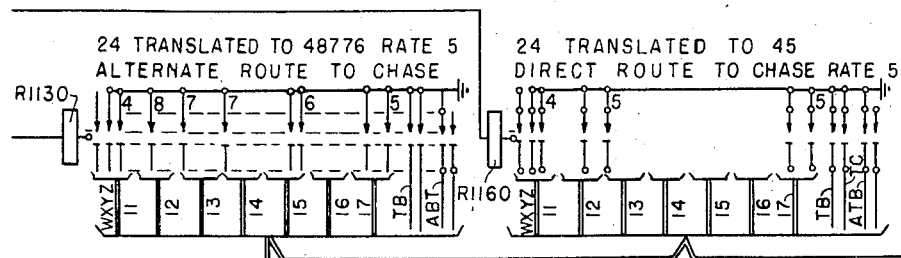
FIG. 11

CALL REGISTER
1200

Sept. 16, 1958  A. H. FAULKNER  2,852,613
REGISTER-SENDER ARRANGEMENT
Filed Feb. 28, 1957  14 Sheets-Sheet 13
FIG. 14
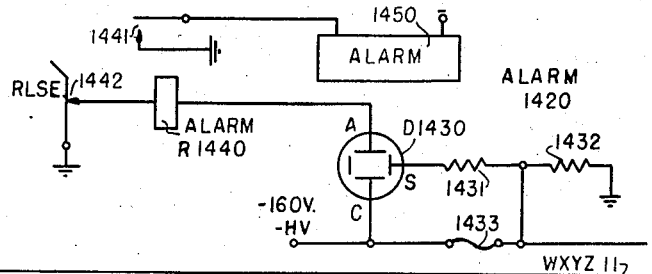
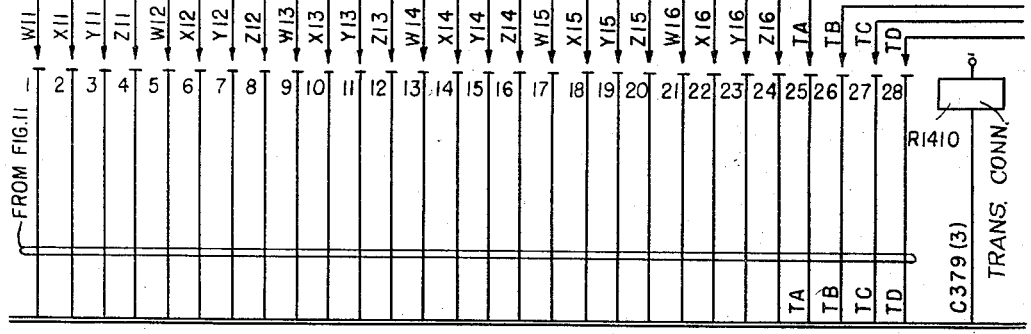
INVENTOR.
ALFRED H. FAULKNER
BY
ATTYS.

United States Patent Office 2,852,613
Patented Sept. 16, 1958

2,852,613

REGISTER-SENDER ARRANGEMENT

Alfred H. Faulkner, Chicago, Ill., assignor to General Telephone Laboratories, Incorporated, Chicago, Ill., a corporation of Delaware Application February 28, 1957, Serial No. 643,109

8 Claims. (Cl. 179—18)

The present invention relates to automatic telephone systems and particularly to register-sender arrangements.

Generally, register-sender units are utilized in the various exchanges of an automatic telephone system, in conjunction with translator units, for the purpose of registering the digits identifying called subscriber stations located in distant exchanges and for causing at least certain of these digits to be translated to routing digits useful for the purpose of establishing a connection between the calling exchange and called exchange. In such a system the register-sender is provided with a call register for registering each of the digits of a called subscriber station number in a distant exchange and responsive thereto a translator unit associated with the register-sender is operated in order to translate certain of these digits to routing digits. The register-sender then registers the routing digits in a route digit register or "coder" and then causes a control unit or "controller" to transmit the routing digits and others of the digits registered in the call register from the register-sender for the purpose of operating switching apparatus in order to complete a connection from the calling subscriber station to the called subscriber station. Such an arrangement is described in the John E. Ostline Patent No. 2,678,353, issued May 11, 1954.

It is an object of the present invention to provide an improved register-sender unit wherein the route digit register is substantially entirely electronic in its operation and the control unit is selectively operative from the route digit register in accordance with the operational state thereof.

An additional object of the invention is to provide an improved register-sender unit, including an electronic route digit register having a plurality of individual registers, pulse transmitter operative for transmitting groups of control pulses corresponding to registered digits, and a switch operative for connecting the individual registers of the route digit register to the pulse transmitter, wherein the switch is operative responsive to the absence of a digit registration in the one of the individual registers connected to the pulse transmitter for associating another individual register with the pulse transmitter.

A more specific object of the invention is to provide an improved register-sender unit including a route digit register provided with a plurality of individual registers, wherein each individual register includes a diodic discharge device each of which is biased for conduction between its anode and cathode and each of which is rendered conductive responsive only to the application of a start potential to the start electrode thereof, and wherein the start potential is selectively applied to the discharge devices of the route digit register from the translator in accordance with the route digits translated therein. The register-sender unit is arranged so that upon registering of the route digits in the route digit register and responsive to conduction in the discharge devices thereof, the translator is caused to be released from the register-sender and the controller of the register-sender is operated to commence transmission of groups of control pulses corresponding to the registered route digits.

Further features of the invention pertain to the particular arrangement of the circuit elements of the register-sender unit, whereby the above outlined and additional operating features thereof are attained.

The invention, both as to its organization and method of operation, together with further objects and advantages thereof, will be best understood by reference to the following specification taken in conjunction with the accompanying drawings in which:

Figure 1 illustrates the general arrangement of the apparatus incorporated in a telephone exchange including the present invention;

Figs. 2 to 15, inclusive, taken together, show the details of the register-sender and translator included in the exchange of Fig. 1; and Fig. 16 illustrates the mode of combining Figs. 2 to 15, inclusive, to form a unitary circuit arrangement.

*The general arrangement of the telephone exchange*

Referring now to Fig. 1 of the drawings, it is observed that the telephone exchange thereof, identified as the Florida 1 exchange, includes a plurality of subscriber lines having access to trunks extending to distant exchanges. In the automatic telephone system, calling connections are set up by automatic switching apparatus under the control of the subscriber station equipment which includes a calling device or dial. Control is furnished to the automatic switching equipment by means of a seven-digit directory number comprising two code-digits corresponding to the first two letters of the called exchange name, a third code digit corresponding to the numerical identification of the called exchange and a four-digit number corresponding to the numerical identification of the called subscriber station in the identified exchange. Each subscriber station, including the subscriber station 401X, has associated therewith a line circuit, such as the line circuit 405X, which extends to a distributor 105 and which is accessible to a plurality of finder-selector switching groups including the group made up of a finder 106 and a primary selector 500X.

There is included in the Florida 1 exchange a group of register-senders, including the register-sender 200, each of which is accessible to the various primary selectors by means of an individually associated register-sender hunter, including the register-sender hunter 450X associated with the primary selector 500X. Each of the register-senders, such as the register-sender 200, comprises a controller 300, a code switch 800, a call register 1200, and a coder 1500.

Additionally, the exchange is provided with a translator 1000 which may be associated with any calling register-sender by means of a translator assigner 700, wherein certain of the code digit numbers are translated to routing digit numbers. These routing digits are transferred from the translator to the register-sender and registered therein for purposes of operating the switching apparatus in the exchange to extend a connection to a selected one of the outgoing trunks terminated thereat.

Each of the outgoing trunks is terminated in an individually associated repeater circuit, such as the repeater 107, which is accessible from the primary selector 500X. Though not shown, it is understood that each exchange may be provided with a toll ticketing arrangement accessible to the primary selectors in which a record can be made of information with regards to toll calls extended from the exchange.

In addition, the exchange may be provided with a local switch train operative for the purpose of completing calls to the subscriber stations in the exchange both from other subscriber stations in the exchange and from subscriber stations in distant exchanges. This equipment has not been shown in the drawings inasmuch as it is considered not to be important to the understanding of the operation of the register-sender and translator arrangement of the present invention.

*The apparatus included in the Florida 1 exchange*

Considering now the apparatus included in the exchange and referring specifically to Fig. 2 of the drawings, certain of the apparatus is shown in box form and identified by numerical characters carrying a suffix X. The equipment carrying the numerical characters having the suffix X corresponds precisely to apparatus shown in the J. E. Ostline Patent No. 2,678,353, issued May 11, 1954, having the same numerical characters. The subscriber station 401X of the present case is identical to the subscriber station 401 disclosed in the above patent and is provided with station apparatus including a telephone instrument, a ringer, and a calling device or dial, and is operative in response to a call initiated at the station 401X to operate the line circuit 405X, to mark the line as calling, and to initiate operation of the distributor 105 for seizing an idle finder-selector group. Assuming that the distributor 105 seizes the group including the finder 106 and the primary selector 500X, the finder 106 is operated to seize the line marked as calling and to complete a connection from the subscriber station 401X to the primary selector 500X. Thereupon, the station apparatus in the subscriber station 401X is operated to transmit to the primary selector a seven-digit number including three code digits and four subscriber number digits. Assuming that the code digits identify a distant exchange, the primary selector 500X operates the register-sender hunter 450X to seize an idle register-sender such as the register-sender 200 wherein the seven digit number is registered and the translator is operated to translate the distant exchange code digits to routing digits which are transmitted back to the register-sender and re-registered therein.

It should be noted that the present telephone system employs code storage registering apparatus and code marking conductors for the purpose of registering various digits and for transferring the register digits from one unit of equipment to another. The combinational code employed is generally referred to as a WXYZ code and is of the type wherein any digit from 1 to 9, inclusive, and 0 may be registered and transmitted by operating any one or two of four individual WXYZ register devices and by marking any one or any two of four individual WXYZ marking conductors in accordance with the following code:

| Digit: | Code |
|---|---|
| 1 | WX |
| 2 | WY |
| 3 | WZ |
| 4 | XY |
| 5 | XZ |
| 6 | YZ |
| 7 | W |
| 8 | X |
| 9 | Y |
| 0 | Z |

Each register-sender, such as the register-sender 200, is provided with a plurality of circuits including a controller 300, a code switch 800, a call register 1200 and a coder 1500. The controller 300 is operative for controlling operations of the register-sender in receiving digits from the primary selector 500X registering the digits therein, seizing the translator 1000, causing certain of the digits registered therein to be transferred to the translator 1000, receiving the translated digits from the translator 1000 and transferring these digits along with certain others of the registered digits therein to the primary selector 500X. The call register 1200 is operative for registering all of the digits transmitted thereto from the primary selector 500X and the code switch 800 operates under the control of the controller 300 for transferring certain of the digits registered in the call register 1200 to the translator 1000 for translation. Inasmuch as the translator 1000 is of the type which translates the digits transmitted thereto to routing digits in a code form, the routing digits transmitted to the register-sender from the translator 1000 are received in the register-sender in code form and converted from code form to numerical form in the coder 1500 whereupon these converted routing digits, along with certain other of the digits registered in the called register 1200, are transmitted to the primary selector 500X for operating the primary selector and the switching apparatus accessible thereto in order to extend a connection to the called station in the distant exchange.

*Seizure of an idle register-sender*

Figure 8:
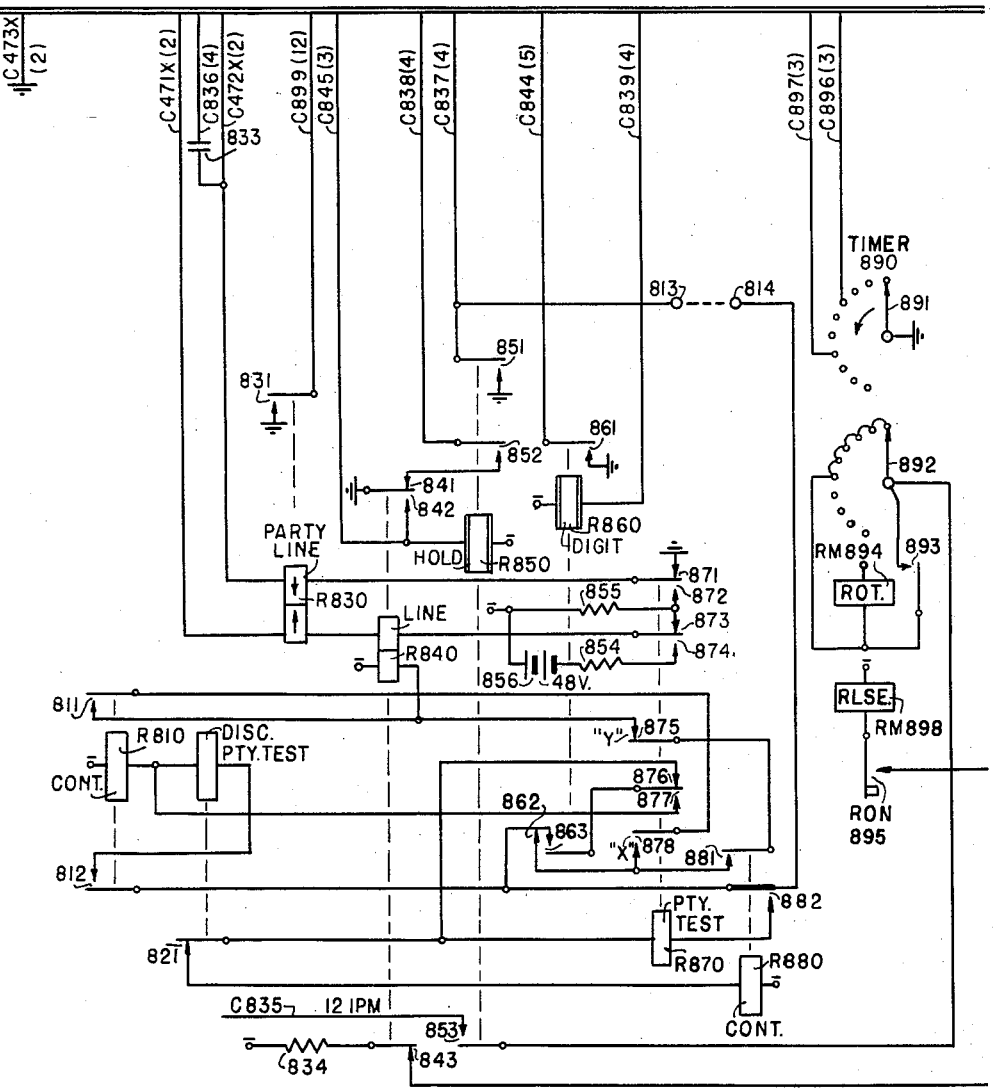
Figure 9:
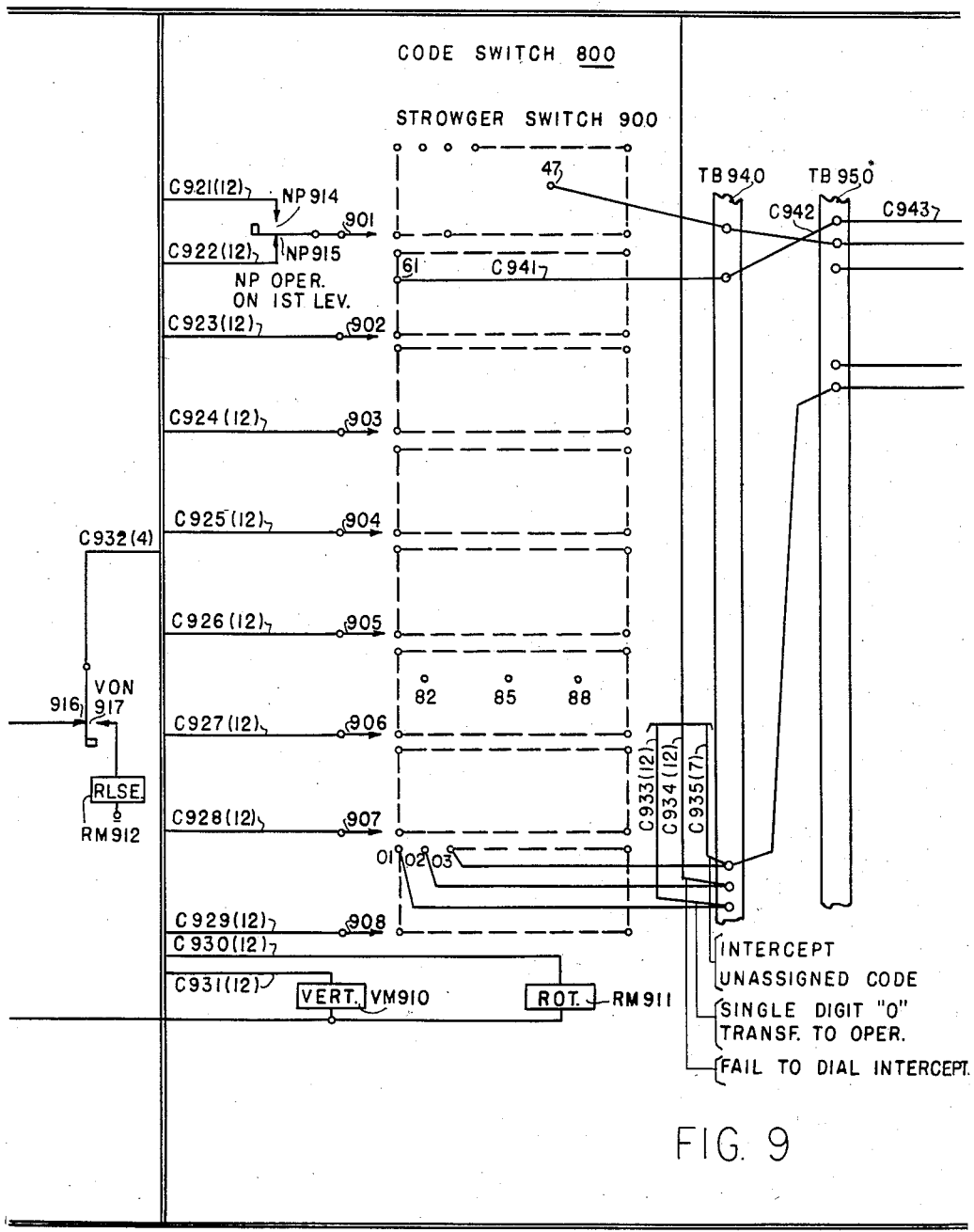
Figure 10:
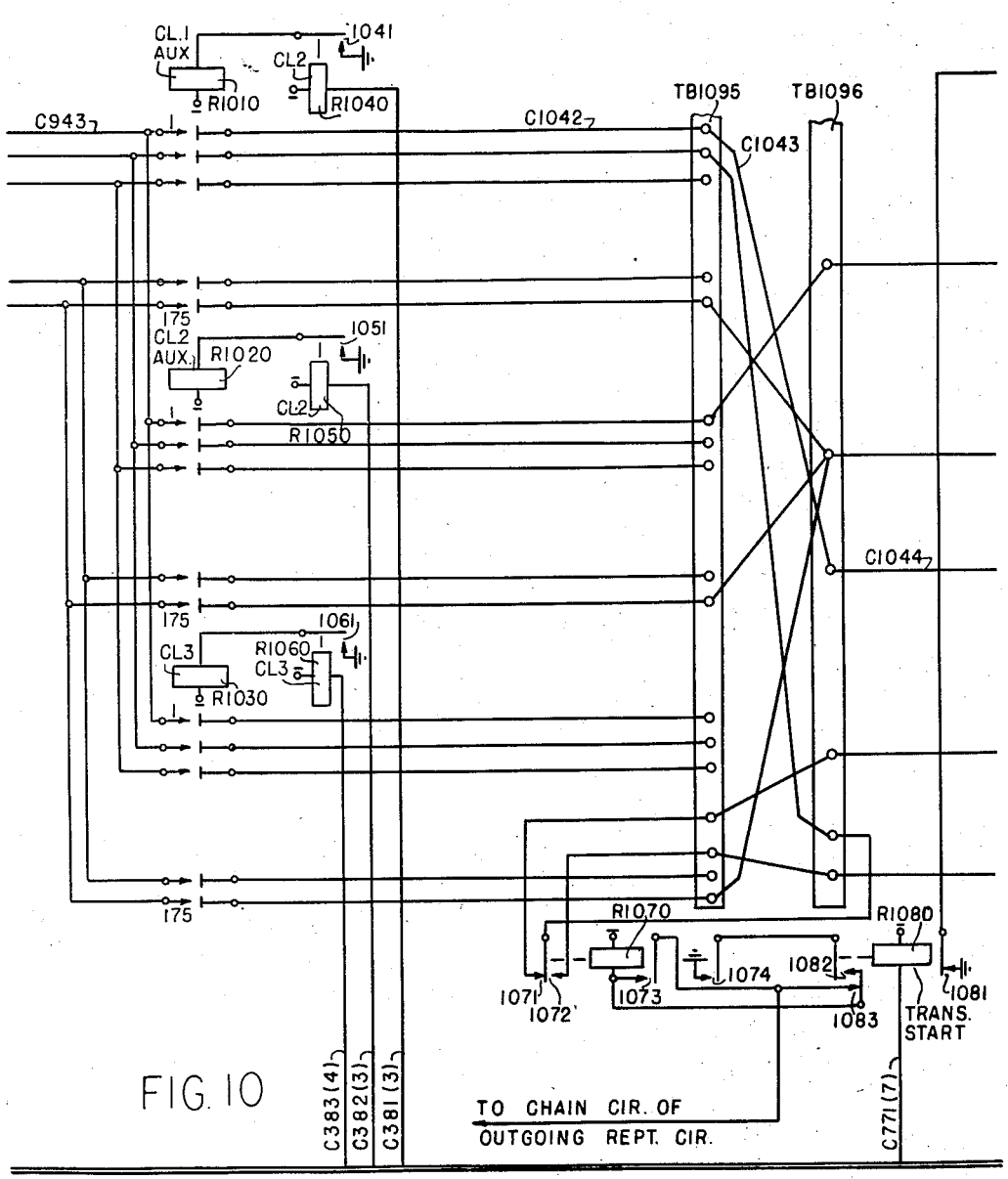
Figure 12:
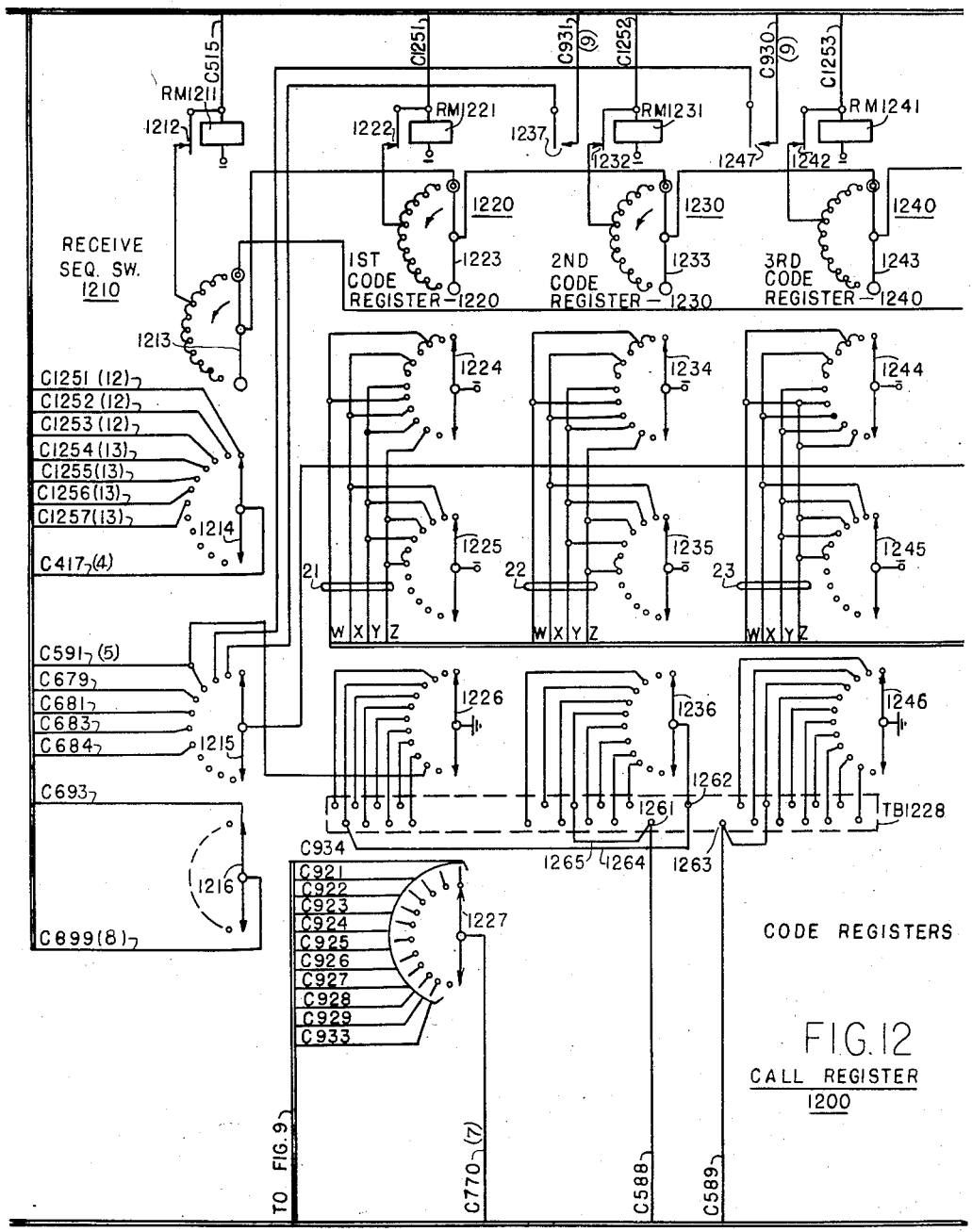

Assuming that the subscriber at the station 401X has initiated a call and has dialed the digits identifying a subscriber station in the distant exchange EMpire 1, the line circuit 405X, the distributor 105, and the finder 106 and primary selector 500X have been operated in a manner as previously explained whereby the register-sender hunter 450X is operated to seize an idle register-sender, such as the register-sender 200, accessible to the hunter 450X over the conductors C468X to C475X, inclusive. Further, assuming that the register-sender 200 is the first sender in the group thereof that is idle, the wipers of the register-sender hunter 450X engage the conductors C471X and C472X to complete a calling subscriber group circuit to the code switch 800 (Fig. 8). Specifically, the loop circuit is completed via the conductor C471X through the lower winding of the party line relay R830, and the upper winding of the line relay R840 through contacts 873 and the resistor 855 to battery; and the circuit through the conductor C472X is completed via the upper winding of the party line relay R830 and contacts 871 to ground potential. When the above traced circuit is completed the line relay R840 operates but the party line relay R830 does not operate due to the fact that the windings of the relay are differentially wound and oppose each other to prevent operation. Upon operating, the line relay R840 completes at its contacts 842 an obvious circuit for operating the hold relay R850. The relay R850 upon operating applies ground potential at its contacts 851 to the conductor C837 extending to the controller 300 (Fig. 4) and then through the winding of the seizure relay R450 to battery so that the seizure relay R450 is operated. Also, at the contacts 852, the relay R850 prepares a point in a pulsing circuit extending by way of the conductor C838 to the controller 300 (Fig. 4) and then by way of the contacts 471 to the conductor C839 extending to the code switch 800 and to the conductor C417 extending to the call register 1200 (Fig. 12). Specifically, the pulsing circuit completed by way of the conductor C839 extends through the winding of the digit relay R860 in the code switch 800 to battery and in the call register 1200 the conductor C417 is connected to the wiper 1214 of the receiving sequence switch 1210.

Considering again the operation of the controller 300 (Figs. 3 to 6) it should be noted that when the seizure relay R450 operates it applies at its contacts 451 ground potential to the conductor C487 extending to the coder 1500 (Fig. 15) and extending to the bank contacts accessible to the wiper 1364 of the sender switch 1360; at its contacts 457 it applies ground potential to the conductor C494 extending to the call register 1200 in order to prepare the call register for further operation; and at its contacts 455 it completes a circuit from ground potential via the winding of the hold relay R520, the contacts 482 and 455, the conductor C474X extending to the battery potential in the register-sender hunter 450X. When the above traced circuit is completed, the hold relay R520 operates and completes the circuit in the register-sending hunter 450X for preventing further stepping operation of the wipers associated therewith.

Further, the relay R450 completes at its contacts 453 a circuit from ground potential via the resistor 315 and the winding of the busy relay R310 to battery potential, whereupon the relay R310 operates and closes at contacts 311 a circuit for applying ground potential to the conductor C475X extending to the register-sender hunter 450X to mark the register-sender 200 as busy. Finally, at the contacts 459 the relay R450 completes a start circuit for the pulse generator 400. Thereupon, the pulse generator operates and causes pulses at the rate of approximately 10 pulses per second to be transmitted at the contacts 406 through the winding of the pulse relay R580 to battery potential, so that the relay R580 operates at the rate of ten times per second for purposes described hereinafter.

When the hold relay R520 is operated it completes at contacts 521 a circuit extending from ground potential via the contacts 464 and 434 and the winding of the class test relay R420 to battery potential whereupon the relay R420 operates. Upon operating the relay R420 completes at contacts 424 a circuit extending from ground potential through the winding of the slow-to-operate relay R430 to battery potential and a short time thereafter the relay R430 is operated. The operated control relay R430 closes contacts 433 to prepare a circuit for operating the control relay R460 and at the same time opens contacts 434 for interrupting the operating circuit for the relay R420. Thereupon, the relay R420 restores and completes at contacts 423 a circuit extending from ground potential via the contacts 433 and the winding of the control relay R460 to battery potential, whereupon the control relay R460 operates and closes at the contacts 462 a hold circuit for itself from ground potential via the contacts 452 of the operated seizure relay R450. Further, the operated control relay R460 closes contacts 463 for extending dial tone signal applied to the conductor C497 via the contacts 324 and 475 to the conductor C836 extending to the code switch 800, and therein the dial tone signal is extended by way of the capacitor 833 to the calling subscriber line over the previously traced looped circuit including the conductors C471X and C472X.

*Dialing the called number*

In response to dial tone returned to the subscriber station 401X, the subscriber thereat proceeds to manipulate the dial at his subscriber station in order to extend a conneciton to a called subscriber. For purposes of description it is asumed that the called subscriber is in a distant exchange and the subscriber at the station 401X dials a number including three-digits designating the called office and then four-digits designating the called subscriber in the called office. In response to the dialing of the first digit at the subscriber station 401X, the line relay R840 in the code switch 800 follows the pulses of the digit and in response to the first pulse the line R840 restores to normal and at the contacts 841 applies a ground potential by the way of the contacts 852 to conductor C838 extending to the controller 300 and then by way of the conductor 839 to the code switch 800 to operate the digit relay R860. The latter relay at its contacts 861 applies ground potential to conductor C844 extending to the controller 300 in order to operate the sequence control relay R530. Inasmuch as the relay R860 is of the slow-to-release type, it remains in the operated position during the time that the line relay R840 is pulsing under the control of the calling subscriber dial. The impulsing ground potential applied to the conductor C838 is also extended in the controller 300 by way of the contacts 471 to the conductor C417 extending to the call register 1200 and therein by way of the wiper 1214 of the receiving sequence switch 1210 and the engaged contact 1 of the associated bank, the conductor C1251 to the winding of the rotary magnet RM1221 of the first code register 1220 to battery. Accordingly the magnet RM1221 operates upon each restoration of the line relay R840 and restores to normal upon each energization of the relay R840. Each time the magnet RM1221 restores, it causes the wipers 1223 to 1227, inclusive, to be advanced to the next set of contacts in the associated contact banks in order to register the number of impulses for the first digit dialed by the calling subscriber.

At the end of the first digit the wipers of the first code register 1220 engage the contacts of the associated contact banks corresponding to the digit dialed by the calling subscriber. At this time the wipers 1224 and 1225 mark the code conductors WXYZ21, terminated at in the associated contact banks, in accordance with the digit registered. The wiper 1227 selects a corresponding one of the conductors terminated at its associated contact bank which extends to the code switch 800 (Fig. 9) and to one of the eight wipers of the code switch.

Referring back to the operation of the sequence control relay R530, it should be noted that when the relay operates it completes at the contacts 531 a circuit by way of conductor C515 extending to the call register 1200 for energizing the magnet RM1211 of the receiving switch 1210 which is not operated at this time inasmuch as it is the operate-upon-release type. Shortly following the conclusion of the first digit dialed by the calling subscriber the digit relay R860 restores to normal and interrupts at its contacts 861 the circuit for operating the control relay R530, whereupon the previously traced circuit for energizing the magnet RM1211 is interrupted and the magnet RM1211 is operated to cause the wipers 1213 to 1216, inclusive, to be advanced into engagement with the second set of contacts in the associated contact banks. This stepping action causes the pulsing circuit extending to the call register 1200 to be transferred from the first code register 1220 to the second code register 1230 so that the second dialed digit will be registered in the second code register. At this time the call register 1200 is prepared to receive the pulses corresponding to the second digit dialed by the subscriber at the station 401X.

Responsive to the dialing of the second digit at the subscriber station, the line relay R840 follows the pulses and again causes the digit relay R860 to operate and to remain operated during the dialing of the second digit. Upon operating the relay R860 again applies ground potential to the conductor C844 extending to the sequence control relay R530, whereupon the latter relay is operated. The line relay R840, at its contacts 841, repeats the pulses of the second digit over the conductor C838 of the pulsing circuit and, at its contacts 842, retains the hold relay R850 operated. After the pulses constituting the second digit of the called subscriber number has been received and repeated by the line relay R840, the relay remains operated. The remaining digits of the called subscriber number dialed by the subscriber are received and repeated by the line relay R840 in the same manner as has been described above in connection with the dialing of the first and second digits. The manner in which the digits are registered in the call register 1200 of the register-sender 200 is considered hereinafter.

*Registration of the called number in the call register 1200*

It will be recalled that upon each restoration of the line relay R840 a circuit is completed for transmitting ground pulses over the conductors C838 and the contacts 471 to the conductor C417 and the wiper 1214 of the receiving sequence switch 1210 in the call register 1200. At the same time these ground pulses are transmitted via the conductors C838 and the contacts 471 to the digit relay R860 which completes at contacts 861 a circuit for extending ground potential over the conductor C844 in order to operate the sequence control relay R530. The latter relay upon operating completes at its contacts 531 a circuit for extending ground potential via the conductor C515 in order to operate the rotary magnet RM1211 of the receiving sequence switch 1210.

Referring now to the call register 1200, ground pulses transmitted to the wiper 1214 of the sequence switch 1210 are extended through the first bank contact and over the conductor C1251 to the winding of the rotary magnet RM1221 of the first code register 1220. The magnet RM1221 operates in response to each ground pulse transmitted thereto so that in response to the dialing of the first digit of the called subscriber number the wipers 1223 to 1227, inclusive, of the first code register 1220 are operated by the magnet RM1221 to advance a number of steps corresponding to the number of pulses in the digit dialed. Accordingly, the first code register 1220 registers the first digit of the called subscriber number.

As pointed out above, at the end of the first digit the relay R530 restores to normal and interrupts the circuit for energizing the rotary magnet RM1211 of the receiving sequence switch 1210, whereupon the rotary magnet is operated and causes its wipers 1213 to 1216, inclusive, to be advanced in a counter-clockwise direction into engagement with the second contacts of the associated contact banks. The wiper 1214 transfers the pulsing circuit extending thereto over the conductor C417 from the first code register 1220 to the second code register 1230 by completing a connection to the conductor C1252 extending to the rotary magnet RM1231. The wiper 1215 prepares at its contacts a circuit including the contacts 1237 of the rotary magnet RM1231 for controlling the vertical magnet VM910 of the Strowger switch 900 which comprises the code switch 800. This circuit for controlling the switch 900 in a vertical direction is completed incident to the recurring operation of the rotary magnet RM1231 under control of the pulses of the second digit dialed by the calling subscriber. At this time the call register 1200 is prepared to receive and to register the second digit dialed by the calling subscriber.

When the calling subscriber dials the second digit, the line relay R840 repeats the pulses over the conductor C838 to cause the digit relay R860 and the sequence control relay R530 to be operated and the rotary magnet RM1211 to be energized in the manner as previously described. Additionally, the pulses repeated to the conductor C838 are extended via the conductor C417 and the wiper 1214 of the receiving sequence switch 1210 to the rotary magnet RM1231 of the second code register 1230 in order to cause the wipers of the code register 1230 to be advanced in a counter-clockwise direction a number of steps corresponding to the number of pulses in the second digit. Accordingly, the second digit is registered in the second code register 1230 in the same manner as the first digit was registered in the first code register 1220. In addition to causing the digit to be registered in the second code register 1230, the magnet RM1231 upon each operation closes at its contacts 1237 a circuit for operating the vertical magnet VM910 of the Strowger switch 900. This circuit may be traced from ground potential at the contacts 457 of the operated seizure relay R450 in the controller 300 (Fig. 4), the conductor C494, the wiper 1215 of the receiving sequence switch 1210, the second contacts of the associated contact bank, contacts 1237, conductor C931, the winding of the vertical magnet VM910, contacts 843, and a resistor 834 to battery potential. Inasmuch as the magnet RM1231 closes the contacts 1237 upon each operation thereof and under control of the line relay R840, the vertical magnet VM910 is operated to advance the associated wipers 901 to 908, inclusive, step-by-step in a vertical direction a number of steps corresponding to the number of pulses in a second digit dialed by the calling subscriber. In this manner the code switch 800 is operated substantially simultaneously with the second code register 1230 to register the second digit of the called subscriber number.

At the end of the second digit, the digit relay R860 and the sequence control relay R530 are restored to normal in a manner as previously explained, whereby the rotary magnet RM1211 of the receiving sequence switch 1210 is operated to advance its wipers 1213 to 1216, inclusive, one step in a counter-clockwise direction from engagement with the contacts 2 thereof into engagement with the contacts 3 of the associated contact banks. This transfers the impulsing circuit from the second code register 1230 to the third code register 1240 at the wiper 1214 and via the conductor C1253. At the wiper 1215 the previously traced circuit for operating the vertical magnet VM910 is interrupted and a circuit is prepared at the contact 3 thereof for controlling the rotary magnet RM911 of the Strowger switch 900, which circuit includes contacts 1247 of the rotary magnet RM1241.

The pulses of the third digit dialed by the calling subscriber are repeated by the line relay R840 in the manner as previously described and cause recurring operation of the rotary magnet RM1241 so that the wipers 1243 to 1246, inclusive, of the third coder switch 1240 are advanced in a counter-clockwise direction from the home contacts into engagement with the contacts corresponding to the number of pulses in the third digit. Each time the rotary magnet RM1241 operates it completes the above described circuit for operating the rotary magnet RM911, which circuit extends from ground potential via the wiper 1215, the third contact of the associated contact bank, contacts 1247, conductor C930, the winding of the rotary magnet RM911, contact 843, and resistor 834 to battery potential. Consequently, each time the above traced circuit is closed at the contacts 1247, the rotary magnet RM911 is operated in order to step the wipers 901 to 908, inclusive, a number of steps corresponding to the number of pulses comprising the third digit by the calling subscriber. Accordingly, the third code register 1240 and the code switch 800 register the third digit dialed by the calling subscriber.

From the foregoing it is clear that the first, second and third digits dialed by the subscriber at the calling station are registered respectively in the first, second and third code registers 1220, 1230 and 1240, and that the second and third code digits are registered in the code switch 800 by operation of the Strowger switch 900 respectively in the vertical direction and in the rotary direction.

Referring for a moment to the operation of the code switch 800, it is to be appreciated that the translation of the first three dialed digits into routing digits is accomplished in accordance with the vertical and rotary setting of the wipers associated with the code switch 800 and that for any given vertical and rotary setting of the switches any one of eight translations corresponding to the eight wipers 901 to 908, inclusive, of the code switch can be accomplished. In order to select one desired translation, the wipers 901 to 908, inclusive, are connected respectively to the conductors C921 to C929, the wiper 901 being connected alternatively to the conductor C921 or C922 by means of normal post springs NP914 and NP915. These conductors are connected to individual contacts in the bank of contacts associated with the wiper 1227 of the first code register 1220. In this arrangement one of the conductors C921 to C929, inclusive, is selected at the wiper 1227 of the first code register 1220 in accordance with the operation of the first code register in registering the first code digit. The system is arranged so that in the event the code switch 800 is stepped only one step in a vertical direction, the normal post contacts NP914 are closed and the contacts NP915 are opened, and for all other vertical step positions the contacts NP915 are closed and the contacts NP914 are opened. From the foregoing it is clear that in response to the dialing of the first three digits of a called subscriber number the code switch 800 is prepared to cause that number to be translated in the translator 1000 for purposes of setting up a connection to the called exchange.

Figure 13:
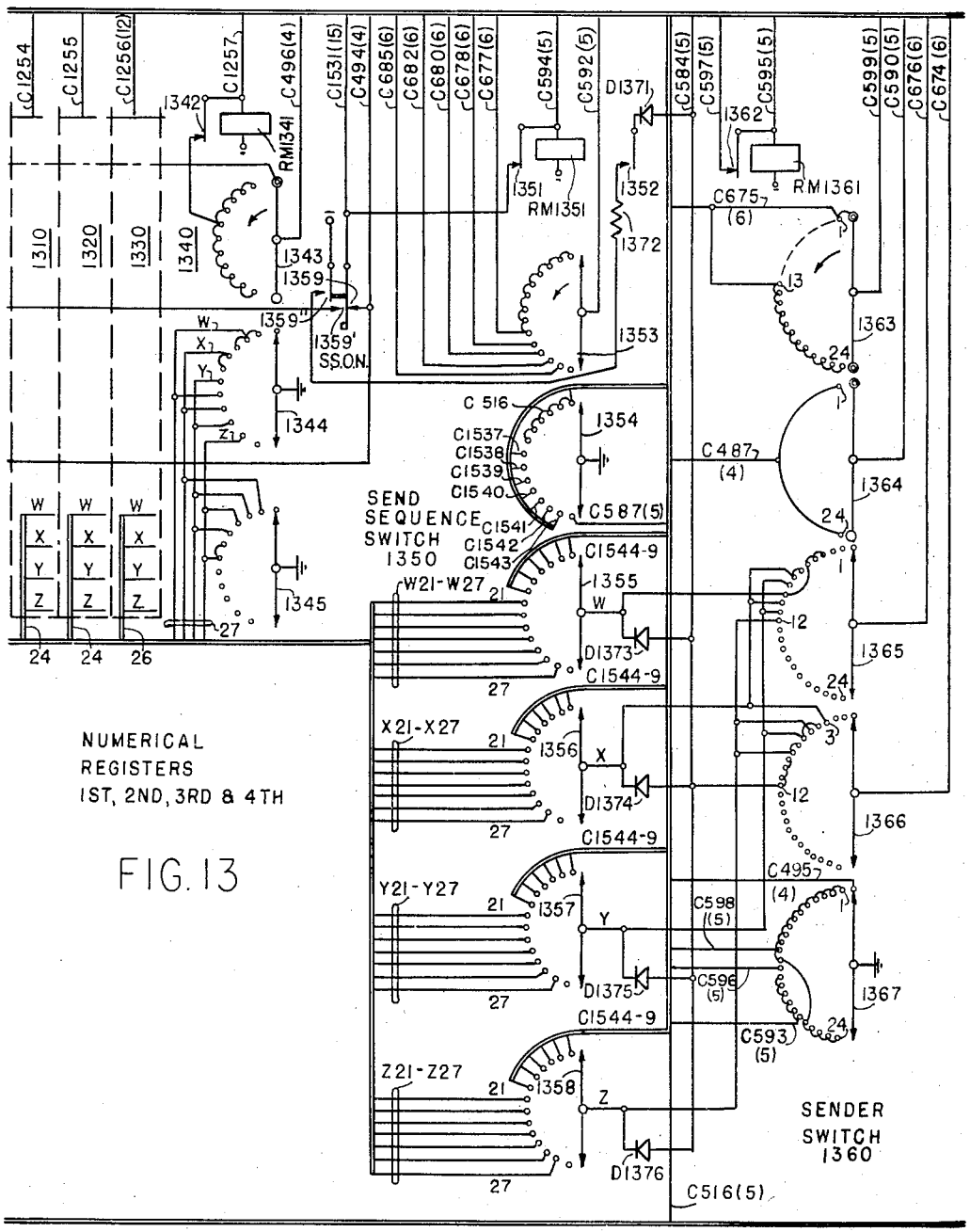

Referring now to the operation of the register-sender 200 in registering the last four digits dialed by the calling subscriber corresponding to the line number of the desired called subscriber, the fourth digit dialed is repeated by means of the line relay R840 in the manner as previously described, via the wiper 1214 of the receiving sequence switch 1210, the fourth contacts of the associated contact bank and the conductor C1254 to the rotary magnet (not shown) of the first numerical register 1310 (Fig. 13). The register 1310 is operated in the same manner as each of the code registers 1220, 1230 and 1240, to register therein the fourth digit dialed. At the end of the fourth digit, the receiving sequence switch 1210 is operated to advance its wipers 1213 to 1216, inclusive, into engagement with the fifth contacts of the associated contact bank so that the pulsing circuit is completed at the wiper 1214 via the conductor C1255 to the rotary magnet (not shown) of the second numerical register 1320. The second numerical register 1320 is thereupon operated in accordance with fifth digit dialed to register the digit therein. At the end of the fifth digit the receiving sequence switch 1210 is operated to extend the pulsing circuit to the third numerical register 1330 wherein the sixth digit dialed is registered and thereupon the receiving sequence switch 1210 is operated to extend the pulsing circuit to the fourth numerical register 1340 in order to register the seventh digit. In this manner the seven digits dialed by the calling subscriber are registered in the call register 1200. The manner in which the register digits are utilized in setting up the connection is considered hereinafter.

*Operation of the register-sender in seizing the translator assigner*

Assuming that the subscriber at the calling station 401X has dialed the directory number EMpire 1–1234 corresponding to a called subscriber in a distant exchange, the call register 1200 has been operated to register the digits 3, 6 and 1, corresponding to the called office code EM 1, respectively in the first, second and third code registers 1220, 1230 and 1240. Also the digits 1, 2, 3 and 4 are registered respectively in the first, second, third and fourth numerical registers 1310, 1320, 1330 and 1340.

In response to the registration of the digit 3 in the first code register 1220, the wipers 1523 to 1527, inclusive, are stepped into engagement with the third contacts at the associated contact banks so that the wipers 1224 and 1225 mark the code conductors WXYZ21 in accordance with the digit three, and the wiper 1227 selects the conductor C923 extending to the wiper 902 of the code switch 800. The second and third registers 1230 and 1240, respectively, advance their associated wipers into engagement with the sixth and first contacts of the associated contact banks. The wipers 1234 and 1235 mark the code conductors WXYZ22 in accordance with the digit six and the wipers 1244 and 1245 mark the WXYZ23 conductors in accordance with the digit one. Additionally, the code switch 800 is operated over the conductors C931 to raise its wipers 901 to 908, inclusive, step-by-step in a vertical direction to a position opposite the sixth level of the associated contact bank and to rotate the wipers into engagement with the first contact in the sixh level of the associated contact bank.

During the dialing of the fourth digit of the called subscriber number, that is the digit "one," the wipers 1213 to 1216, inclusive, of the receiving sequence switch 1210 are stepped into engagement with the fourth contacts of the associated contact banks and the wiper 1215 thereof completes a circuit via the conductor C591 for operating the assigner start relay R340 in the controller 300 in order to cause the translator assigner 700 to find the register-sender 200 being utilized in the present call and to associate the translator 1000 with the register-sender.

Before proceeding with the description of this operation, it should be noted that the exchange is provided with a plurality of register-senders and a single translator 1000 which is called into use by a calling register-sender when it becomes necessary to translate the code digits dialed by the calling subscriber into routing digits. The translator 1000 is provided with a number of individual translator relays which are selectively operative in accordance with the setting of the code switch 800 to provide routing digits for setting up connections between the originating exchange and the particular called exchange over a predetermined route.

Figure 5:
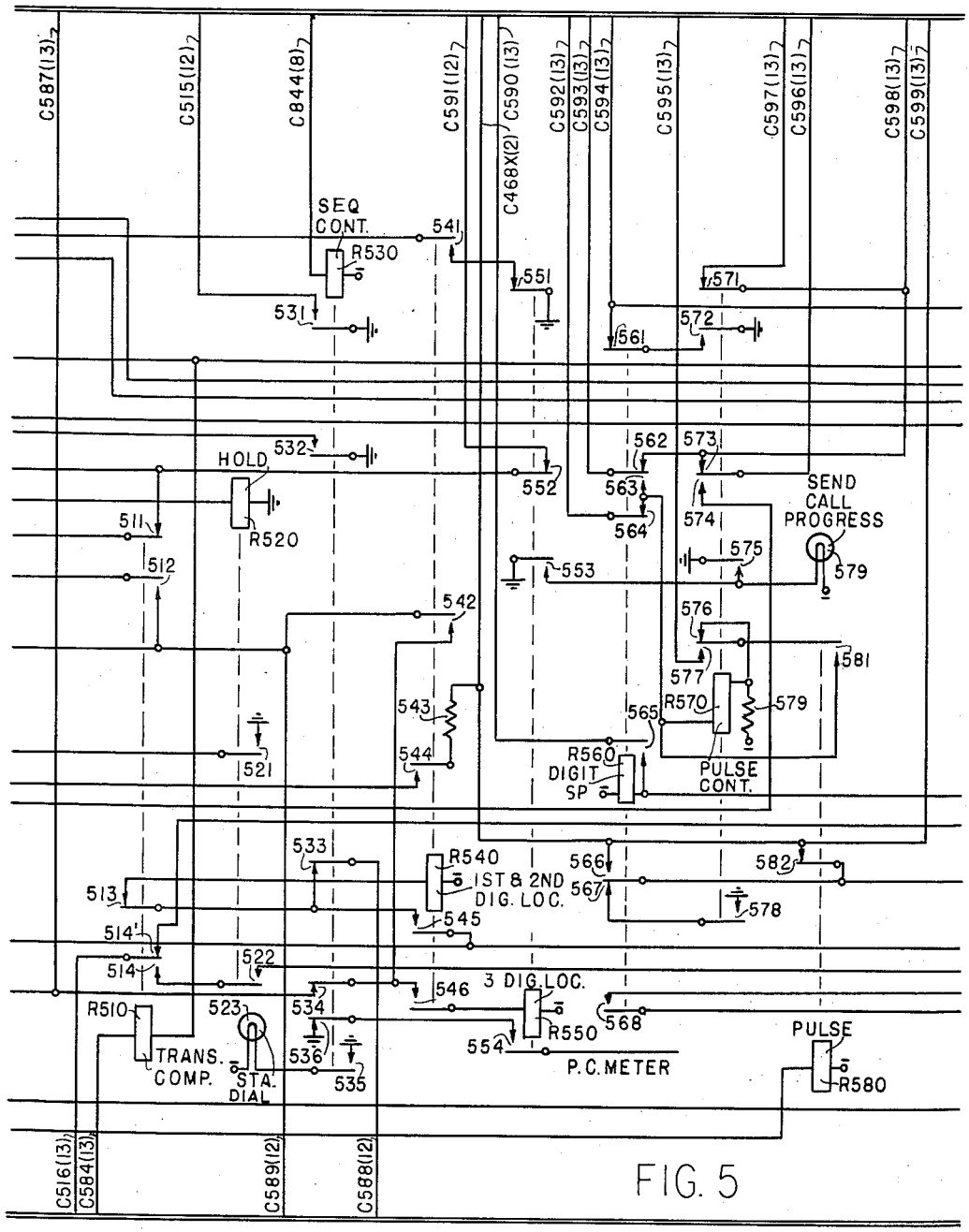
Figure 6:
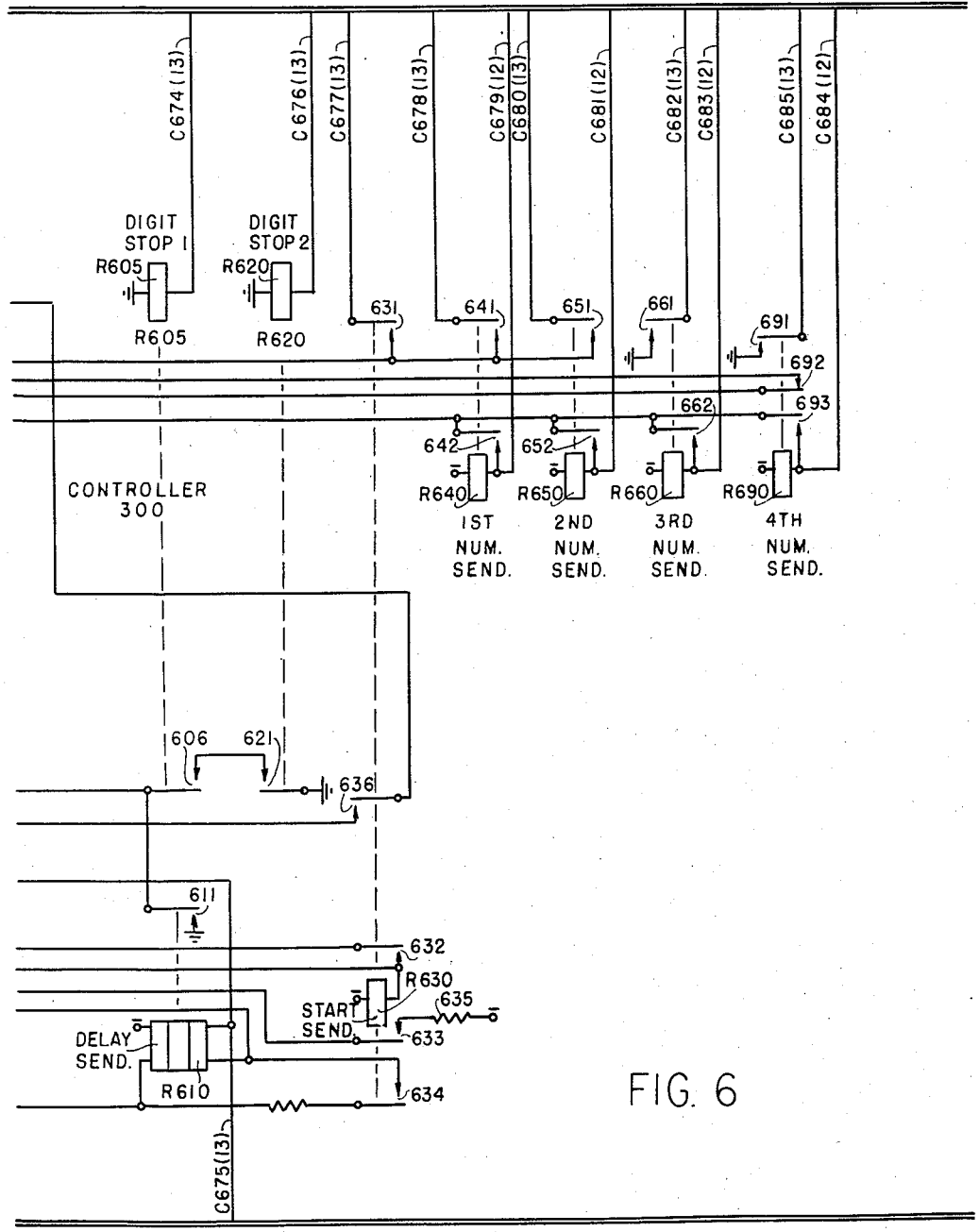
Figure 7:
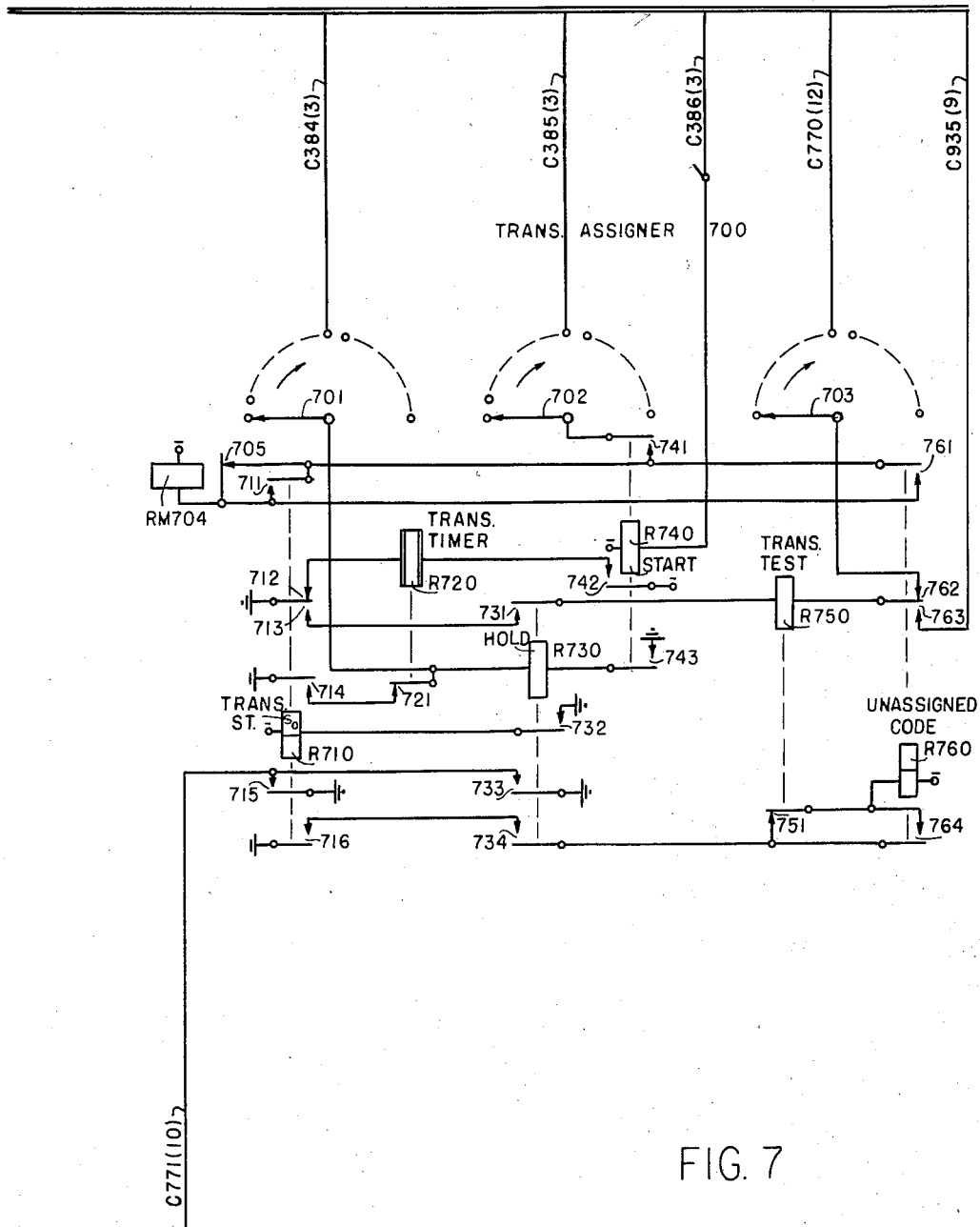

Referring back to the operation of the assigner start relay R340, when the wiper 1215 is stepped into engagement with the fourth contacts of the associated contact bank a circuit is completed from ground potential by way of the contacts 457 of the operated seizure relay R450, the conductor C494 extending to Fig. 13, the wiper 1215 and the engaged contacts, the conductor C591 extending to Fig. 5, contacts 552, 511, 483 and 362, and the winding of the assigner start relay R340 to battery. Upon operating the relay R340 completes at the contacts 345 a hold circuit for itself extending from ground potential via the contacts 456, 345, 511, 483 and 362 to the winding of the relay R340.

Upon operating the relay R340 opens contacts 341 and 343 to remove ground potential from the conductor C385 extending to the translator assigner 700 in order to remove a busy marking ground potential from the contact bank associated with the wipers 702 of the translator assigner. At its contacts 342 the relay R340 connects the assigner test relay R350 to the conductor C385 and at its contacts 344 applies ground potential to the conductor C386 extending to the translator assigner 700 in order to initiate operation thereof for finding the particular register-sender that has been marked by the removal of direct ground potential from the conductor C385 and by the application of resistance ground thereto.

*Operation of the translator assigner 700*

Responsive to the application of ground potential to the start conductor C386 the start relay R740 of the translator assigner 700 is operated. Upon operating the relay R740 applies ground potential at its contacts 743 through the winding of the hold relay R730 to the wiper 701. Additionally, it completes at its contacts 741 a circuit for connecting the wiper 702 to the winding of the rotary magnet RM704 through the interrupter contacts 705. Inasmuch as idle register-senders not requiring the use of a translator apply direct ground potential to their respective hold conductors, such as the hold conductors C385, the rotary magnet RM704 is operated from ground potential on the hold conductor via the wiper 702 and contacts 741 and 705 to battery potential in order to step the wipers 701 and 703, inclusive, until the wipers 702 engage a hold conductor having resistance ground potential applied thereto, whereupon the operating circuit for the rotary magnet RM704 is interrupted and stepping action of the wipers is concluded. In the present circumstance, assuming that the conductor C385 is the first hold conductor having resistance ground potential applied thereto, the wipers are stepped so that the wiper 701 engages the conductor C384, the wiper 702 engages the conductor C385 and the wiper 703 engages the conductor C770.

Battery potential is extended to the conductor C384 via the winding of the translation failure relay R360 and contacts 351 so that in the translator assigner 700 battery potential is extended via the wiper 701 and winding of the hold relay R730 to ground potential at contacts 743. Inasmuch as the relay R730 is of the high resistance type the latter relay is operated but the relay R360 is not operated at this time. Upon operating the relay R730 completes at its contacts 732 an obvious circuit for operating the slow-to-operate start relay R710 and at its contacts 733 applies ground potential to the conductor C771 extending to the translator 1000 for operating the translator start relay R1080.

Shortly thereafter the start relay R710 is operated and closes its contacts 713 a point in a circuit for operating the test relay R750 in series with one of the translator relays in the translator 1000 which has been selected in accordance with the operation of the code switch 800.

Referring to the controller 300, it is noted that the assigner test relay R350 is operated in series with the rotary magnet RM704 of the translator assigner 700 when the wiper 701 engages the conductor C385 extending therefrom. Upon operating the relay R350 closes its contacts 353 to apply ground potential to the conductor C379 extending to the translator connect relay R1410 in the coder 1500 whereupon the latter relay is operated. The relay R1410 upon operating closes its contacts 1 to 28, inclusive, for connecting registers in the coder 1500 to the 28 conductors extending in multiple to the 28 corresponding contacts in each of the translator relays such as the translator relays R1110, R1120, R1130, etc. in the translator 1000. Thereafter, the translator 1000 is operated to transfer to the coder 1500 route digits corresponding to the operated one of the translator relays in a manner as is described hereinafter.

It is well to point out at this time that the coder 1500 of the register-sender 200 is employed for the purpose of registering the routing digits which are marked thereto from the translator 1000 and for thereafter operating the register-sender 200 to transmit pulses corresponding to the routing digits for operating the switching apparatus to select the route extending to the desired called exchange.

*Operation of the translator 1000*

Considering the operation of the translator 1000, when the start relay R710 in the translator assigner 700 is operated and closes its contacts 713 to extend ground potential by way of the contacts 731, the winding of the translator test relay R750, the contacts 762, the wiper 703, the conductor C770 extending to the wiper 1227 of the first code register 1220 and the engaged fourth contacts thereat, the conductor C923 extending to the code switch 800 and the wiper 902 thereof to the engaged contacts 61 of its associated contact bank. Ground potential applied to the contacts 61 is extended by way of the conductor C941 to a terminal on the terminal block TB940 and by way of the jumper C942 to a terminal on the terminal block TB950, and then by way of the conductor C943 in multiple to the first contacts associated with each of the relays R1010, R1020 and R1030. The further extension of this circuit to control the operation of any one of the translator relays including the relays R1110, R1120, etc., depends upon the class of the calling line.

Referring for a moment to the jumper arrangement between the terminal blocks TB940 and TB950, it is noted that each wiper of the Strowger switch 900 of the code switch 800 is provided with a contact bank made up of 10 rows of 10 contacts each and, as there are 8 of such contact banks, as many as 800 separate conductors, such as the conductor C941, may be jumpered from the Strowger switch bank to the terminal block TB940. The number of translator relays, such as the relays R1110, R1120, etc., which are provided in the translator 1000 depends upon the number of code translations which are necessary for extending the call from the exchange to any other exchange in the system. In the telephone system being described it may be required to make 100 or more code translations so that a corresponding number of translator relays would be required, but only 5 such relays are shown and specifically the relays R1110, R1120, R1130 and R1160. The windings of each of the translator relays terminate on the terminal block TB1096 and they may be jumpered to selected terminals on the terminal block TB1095 as required. The terminal block TB1095 provides a means for distributing calls from different classes of calling lines to corresponding translator relays as is described in detail in the above mentioned Ostline Patent No. 2,678,353. Distribution of the connections from the terminal block TB950 of the code switch 800 to the terminal block TB1095 of the translator 1000 is carried out in the translator 1000 by means of contacts individually associated with class relays R1040, R1050, R1060 and their respectively associated auxiliary relays R1010, R1020 and R1030. For purposes of the present description it is assumed that the calling subscriber lines is of the class 1 type so that when the assigner test relay R350 in the controller 300 is operated, ground potential is applied at its contacts 352 to a circuit extending via the contacts 416 and 375 to the conductor C381 extending to the winding of the relay R1040 in the translator 1000, whereupon the relay R1040 operates and closes its contacts 1041 to extend ground potential to the winding of the auxiliary relay R1010 which operates and closes the contacts associated therewith for extending the connection from the terminal block TB950 via the conductor C943 to the conductor C1042, the terminal block TB1095, the conductor C1043, the terminal block TB1096 and conductor C1044 to the translator relay R1120 and through the winding thereof to battery potential. When the above mentioned circuit is completed the relay R1120 operates and closes its contacts 1 to 28, inclusive, to apply ground potential to certain ones of the 28 conductors extending to the coder 1500. The first 24 contacts of the relay R1120 terminates 6 sets of four marking conductors respectively designated WXYZ11 to WXYZ16, inclusive. Additionally, four of the contacts terminate the four conductors designated TA, TB, TC and TD.

For the purpose of this description it is assumed that the routing digits required to extend a connection from the class 1 calling subscriber in the FLorida 3 exchange to a subscriber in the EMpire 1 exchange are the digits 8 and 7. Consequently, when the translator relay RR1120 is operated ground potential is applied to the conductors X11 and W12 respectively, at the contacts 2 and 5 thereof. The grounding of the X11 conductor marks the WXYZ11 conductors in code form with the digit 8 and the grounding of the conductor W12 marks the WXYZ12 conductors in code form with the digit 7. In this fashion as many as six routing digits may be marked on the sets of conductors WXYZ11 to WXYZ16, inclusive. At the same time that the X11 and W12 conductors are grounded the TB conductor is also grounded in order to control the register-sender to transmit the last five digits of the called subscriber number as registered in the call register thereof. In view of the foregoing it is clear that responsive to the operation of the translator relay R1120 the routing digits 8 and 7 are marked to the coder 1500 and the TB conductor extending thereto is grounded in order to cause the register-sender 200 to transmit the last 5 digits registered in the call register 1200 thereof. Further operation of the register-sender 200 is controlled from the coder 1500 in a manner as described hereinafter.

*Operation of the coder in transmitting routing digits from the register-sender*

Figure 15:
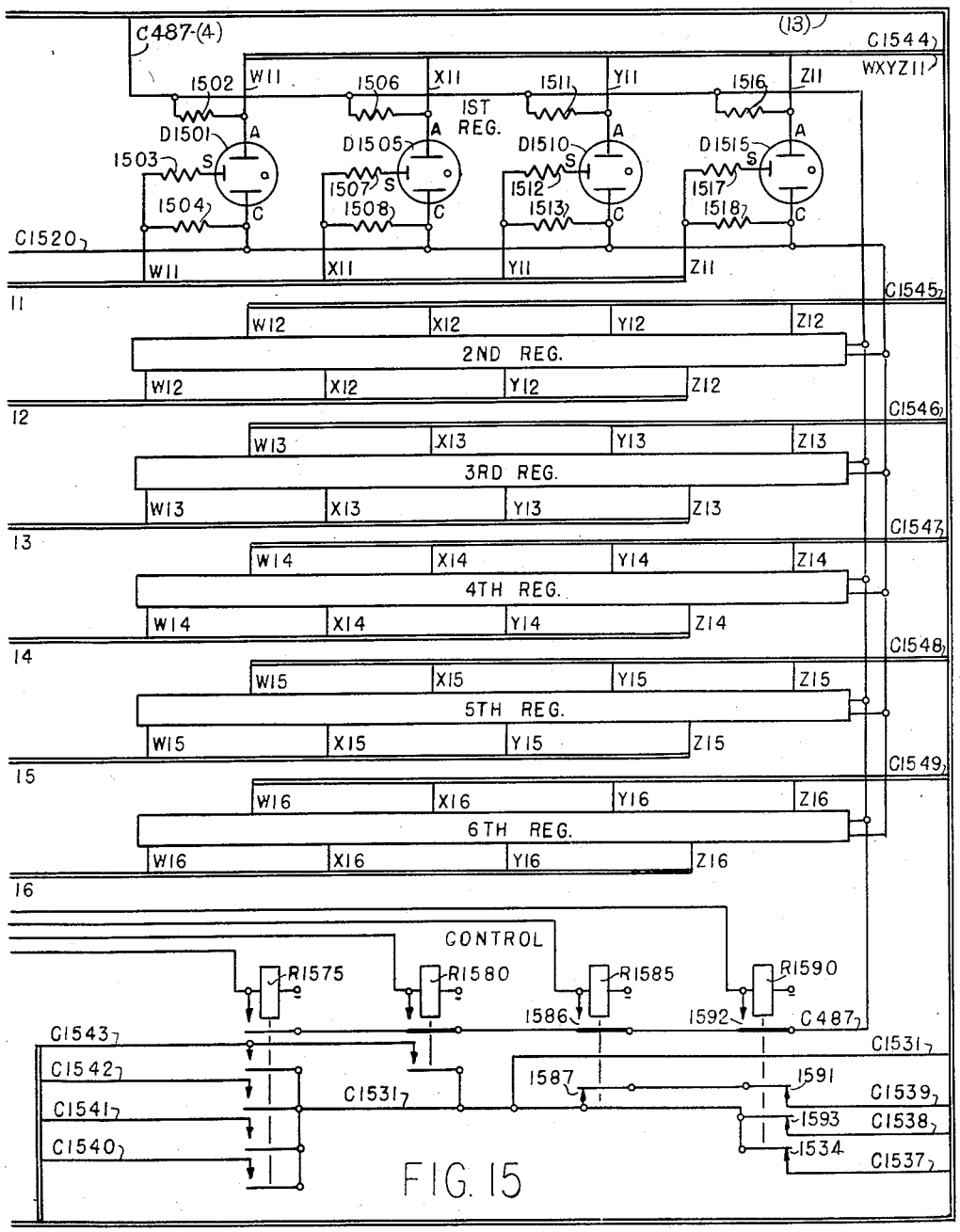

Referring now to Figs. 14 and 15, the coder 1500 thereof includes six registers corresponding respectively to the sets of code marking conductors WXYZ11 to WXYZ16, inclusive. Additionally, there is included therein a group of control relays R1575, R1580, R1585 and R1590 corresponding respectively to the conductors TD, TC, TB and TA. Further, the coder includes an alarm circuit 1420 provided with a cold cathode tube D1430, an alarm relay R1440 and an alarm box 1450.

In the coder 1500 each of the registers, such as the first register, includes a plurality of cold cathode discharge tubes corresponding to the number of code conductors terminated thereat. Thus, in the first register there is included a cold cathode tube D1501 corresponding to the code conductor W11, a cold cathode tube D1505 corresponding to the code conductor X11, a cold cathode tube D1510 corresponding to the code conductor Y11 and a cold cathode tube D1515 corresponding to the code conductor Z11. Each of the diodes are of the gaseous type and include an anode, a cathode and a start-electrode designated in the drawing respectively by the characters A, C and S. The cathodes of the cold cathode tubes are connected through a fuse 1433 to −160 volts. The anodes are connected directly to corresponding code conductors extending to a send sequence switch 1350 in the register-sender 200 and through load resistors to the conductor C487 extending from the controller 300. The start-electrodes are connected to the corresponding code conductors extended from the translator 1000. Specifically, in the first register the anodes of the tubes D1501, D1505, D1510 and D1515 are connected respectively to the code conductors W11, X11, Y11 and Z11 of the trunk C1544 extending to the send sequence switch 1350 and the anodes of the mentioned tubes are connected respectively via the load resistors 1502, 1506, 1511 and 1516 to the conductor C487 extending to the controller 300. The cathodes of the diodes D1501, D1515, D1510 and D1515 are connected to −160 volts and are connected respectively via the code resistors 1504, 1508, 1513 and 1518 to the corresponding code conductors W11, X11, Y11, Z11 incoming from the translator 1000. The start-electrodes of the diodes D1501, D1505, D1510 and D1515 are connected respectively via the resistors 1503, 1507, 1512 and 1517 to the corresponding code conductors W11, X11, Y11 and Z11 incoming from the translator 1000. The second to sixth registers, inclusive, of the coder 1500 are equipped and connected in the same manner as the first register so that the individual code conductors of the conductor sets WXYZ12 to WXYZ16, inclusive, incoming from the translator 1000, have access to the individual code conductors WXYZ12 to WXYZ16, inclusive, of the trunks C1545 to C1549, inclusive, extending to the send sequence switch 1350.

Considering now the manner in which the registers of the coder 1500 are operated in order to register the routing digits marked thereto from the translator 1000 and to transfer said such markings to the send sequence switch 1350, the diodes in the registers of the coder 1500 are rendered operative responsive to the operation of the seizure relay R450 in the controller 300, by ground potential applied to the conductor C487 at the contacts 451. Thereafter, when the translator connect relay R1410 of Fig. 14, and a translator relay, such as the relay R1120 in the translator 1000 are operated, ground potential applied to any of the code conductors WXYZ11 to WXYZ16, inclusive, is extended to the start electrodes of the corresponding cold cathode tubes in the registers of the coder 1500. Assuming, as in the present case, that the translator relay R1120 is operated so that ground potential is applied to the code conductor X11 and the code conductor W12, this ground potential is extended to the corresponding cold cathode tubes in the first and second registers. In the first register ground potential on the conductor X11 is extended via the resistor 1507 to the start-electrode of the diode D1505, thereby establishing a potential of 160 volts between the start-electrode and the cathode thereof. Thereupon an ionization takes place in the tube causing the tube to discharge and to support a current flow from ground potential on the conductor C487 through the resistor 1506, the anode and the cathode of the tube 1505 to −160 volts. The characteristics for the diode D1505 and the value of the resistor 1506 are chosen so that when the diode D1505 is conductive the potential at the anode is approximately −90 volts but not less than −40 volts. Once rendered conductive further operation of the cold cathode tube is independent of the potential applied to the start-electrode so that when the translator is released a short time thereafter the diode D1505 remains operated until ground potential is removed from the conductor C487 in the controller 300 of the register-sender 200. In this manner the routing digit 8 is stored in the first register of the coder 1500 and marked in code form on the conductor X11 of the trunk C1544. In a similar manner the routing digit 7 is stored in the second register and marked on the conductor W12 of the trunk C1545. At the same time ground potential applied to the conductor TB in the translator 1000 it is extended to the relay R1585 in the group of control relays of the coder 1500 through the winding thereof to battery potential whereupon the latter relay operates and closes at its contacts 1586 a hold circuit for itself from ground potential on the conductor C487 and opens the contacts 1587 associated with control conductor C1539 extending to the send sequence switch 1350.

Before considering further the operation of the coder 1500 in causing routing digits and certain of the digits registered in the call register 1200 to be transmitted from the register-sender 200, it is well to consider the structure of the send sequence switch 1350. The send sequence switch 1350 is provided with six wipers and associated contact banks respectively designated 1353 to 1358, inclusive, and a rotary magnet RM1351 operative for stepping the wipers across the associated contact banks. The wipers 1355 to 1358, inclusive, are respectively designated the W, X, Y and Z wipers inasmuch as the associated contact banks terminate the correspondingly identified W, X, Y and Z code conductors of the trunks C1544 to C1549, inclusive, extended thereto from the coder 1500. Specifically, by way of example, the first six contacts of the bank associated with the W wiper 1355 terminate the code conductors W11 to W16, inclusive, of the trunks C1544 to C1549, inclusive. The next seven contacts in the bank associated with the W wiper 1355 terminate the W21 to W27, inclusive, code conductors extending from the code registers 1220 to 1240, inclusive, and the numerical registers 1310 to 1340, inclusive. The connections at the contact banks associated with the X wiper 1356, the Y wiper 1357 and the Z wiper 1358 corresponds to the pattern of connections at the contacts of the contact banks associated with the W wiper 1355 so that the contact banks of the mentioned wipers terminate the correspondingly identified code conductors extending from the coder 1500 and from the call register 1200. The rotary magnet RM1351 of the send sequence switch 1350 is operable over multiple paths and its initial operation in stepping the wipers 1353 to 1358, inclusive, from engagement with the home contacts of the associated contact banks into engagement with the first contacts of the associated contact banks is controlled from the controller 300 responsive to the operation of the seizure relay R450 therein. Upon operating the relay R450 closes at contacts 457 a circuit for extending ground potential via the conductor C494 extending to the send sequence switch 1350, through the normally closed contacts 1359 of the send sequence switch off-normal springs SSON, and the self-interrupting contacts 1351 of the rotary magnet RM1351 through the winding thereof to battery potential. Thereupon the rotary magnet RM1351 is energized to interrupt the circuit at the contacts 1351 and is operated and restored causing the associated wipers to be stepped into engagement with the first contacts of the associated bank and to cause the sender sequence switch off normal springs SSON to be operated for opening the contacts 1359 associated therewith and for closing the contacts 1359' associated therewith. Accordingly, the wipers 1355 to 1358, inclusive, respectively, engage the code conductors W11, X11, Y11 and Z11 of the trunk C1544 extended from the coder 1500.

Assuming, as in the present case, that the code conductor X11 of the trunk C1544 has a negative voltage applied thereto to indicate a registering of the routing digit "8," the negative potential thereon is extended via the first contacts of the contact bank associated with wiper 1356 and the mentioned wiper through the diode D1374, the conductor C584 extending to Fig. 5, through the winding of the translation complete relay R510 to ground potential at the contacts 451. Thereupon the relay R510 operates to interrupt at its contacts 511 a previously traced locking circuit for operating the assigner start relay R340, whereupon the latter relay restores to normal in order to cause the translator assigner 700 and the translator 1000 to be released.

Referring to the manner in which the translators assigner 700 is operated in order to cause release of the translator assigner and of the translator 1000 from the register-sender 200, the relay R340 upon restoring opens contacts 342 and closes contacts 341 in order to apply direct ground to the conductor C385 extending to the translator assigner 700 and therein via the wiper 702 and contacts 741 and 705 through the winding of the rotary magnet RM704 to battery potential, whereupon the magnet is energized and interrupts the circuit therefor at the contacts 705. The rotary magnet RM704 operates to step the wipers 701 to 703 into engagement with the next contacts in the bank. At the same time the relay R340 upon restoring opens contacts 344 for removing ground potential from the conductor C386 and assuming that no other register-sender is calling to the translator assigner 700, the start relay R740 thereof restores.

At this time the hold relay R730 restores and interrupts at its contacts 732 the circuit for operating the start relay R710, which also restores to normal. Upon restoring the relay 710 interrupts at its contacts 713 the previously traced circuit for operating the relay R750 and the translator relay R1120 in the translator 1000 in series. These relays R750 and R1120 restore to normal and the latter relay thereupon removes the marking ground potentials from the X11 and W12 marking conductors extending to the coder 1500. As previously pointed out, the removal to ground potential from these conductors does not effect operation of the registers. As both relays R710 and R730 are restored at this time, ground potential is removed from the conductor C771 extending to the translator start relay R1080 in the translator 1000. Thereupon the relay R1080 restores. At this time the translator assigner 700 is restored to normal and released and is prepared to complete another cycle operation when a register-sender applies starting ground potential to the conductor C386.

At the time that the assigner start relay R340 in the controller 300 restores to normal, it interrupts the contacts 342 so that the assigner test relay R350 is restored, thereby removing at the contacts 352 ground potential from the conductors C381 extending to the translator 1000 whereby the operated class 1 relay R1040 is restored to interrupt the connection between the code switch 800 of the register-sender 200 and the translator 1000. Additionally, the relay R350 upon restoring opens contacts 353 for removing ground potential from the conductor C379 extending to the translator connect relay R1410 at the coder 1500 whereupon the relay R1410 restores and completely releases the translator 1000 from the register-sender 200.

From the foregoing it is clear that the translator 1000 is assigned to the calling register-sender for a very short period during which time certain of the information registered in the call register 1200 thereof is translated in the translator 1000 and transferred to and registered in the coder 1500 of the register-sender 200. At the completion of this operation the translator 1000 is released from the register-sender 200 and restored to normal. The further operation of the register-sender 200 is considered with regards to the sending of digits registered in the coder 1500 and the call register 1200.

*Sending of digits from the register-sender*

It is recalled that in response to the operation of the registers in the coder 1500 to register the routing digits, the translation complete relay R510 in the controller 300 was operated. The relay R510, in addition to causing the translator assigner 700 and the translator 1000 to be released from the register-sender 200, completes at its contacts 514 a circuit for operating the start-send relay R630. Specifically, a circuit is completed from ground potential via the wiper 1354 of the send sequence switch 1350, the first contacts of the associated contact bank, the conductor C516 extending to Fig. 5 of the controller 300, contacts 514 of the operated relay R510, contacts 522 of the operated hold relay R520 through the winding of the start-send relay R630 to battery potential, whereupon the relay R630 is operated. The operated relay R630 closes contacts 632 to complete a hold circuit therefor from ground potential via the contacts 458 of the operated seizure relay R450.

The operation of the start-send relay R630 initiates operation of the register-sender to send out the routing digits stored in the coder 1500 and certain of the dialed digits stored in the code and numerical registers of the call register 1200. Specifically, the relay R630 upon operating closes its contacts 631 in order to extend ground potential applied at the contacts 451 of the operated seizure relay R450 to the conductor C677 extending to the first nine contacts of the contact bank associated with the wiper 1353 of the send sequence switch 1350. As is pointed out hereinafter, the application of ground potential to these contacts of the contact bank associated with the wiper 1353 permits the register-sender to commence its digit sending operation. Additionally, the relay R630 upon operating closes its contacts 636 in order to prepare a circuit for operating the rotary magnet RM1351 of the send sequence switch 1350.

As pointed out above, the send sequence switch 1350 is operated at this time so that the wipers 1353 to 1358, inclusive, are positioned in engagement with the first contacts of the associated contact banks so that ground potential applied to the conductor C677 by operation of the start-send relay R630 is extended via the first contact of the contact banks associated with the wiper 1353, the wiper 1353, the conductor C592 extending to Fig. 5 of the controller 300, contacts 564, the winding of the pulse control relay R570 and resistor 579 to battery potential, whereupon the relay R570 is operated. Upon operating the relay R570 closes contacts 577 in order to prepare a circuit for extending ground potential on the conductor C592 via the contacts 564, 581 and 577 to the conductor C595 extending to the rotary magnet RM1361 of the sender switch 1360. It is recalled that the pulse relay R580 is operated and restored at the rate of 10 times per second under control of the pulse generator 400 so that the above traced circuit prepared by the operation of the relay R570 is completed at the contacts 581 at the rate of 10 times a second, whereby the magnet RM1361 of the sender switch 1360 is operated and restored at the rate of 10 times per second.

Before considering further operation of the sender switch 1360, it is well to consider the arrangement thereof. The sender switch 1360 includes five wipers, 1363 to 1367, inclusive, each having associated therewith a contact bank having 24 individual contacts. The rotary magnet RM1361 associated therewith operates to step the wipers into engagement with the individual contacts in order to perform control operations and to test for numerical markings thereon. Referring to the contact bank associated with the wipers 1365 and 1366, it will be noted that the home contact and the first and second contacts thereof are vacant, and that the contacts 3 to 12 thereof are selectively connected to the wipers 1355 to 1358 of the send sequence switch 1350 in order to transfer thereto the route digits registered in the coder 1500 and the directory number digits registered in the call register 1200. The connections between the mentioned wipers of the send sequence switch 1350 are made to the contacts of the contact banks associated with the wipers 1365 and 1366 of the sender switch 1360 so that the registered digits transferred thereto are marked on a numerical basis rather than on a code basis. Operation of the sender switch 1360 will be understood by reference to the detailed explanation thereof covered hereinafter.

Before proceeding with the description of the digits sending operation of the register-sender 200 it should be pointed out that digit impulses are transmitted therefrom via the conductor C468X extending through the register-sender hunter 450X to the primary selector 500X wherein a line relay is operated in accordance with the digit impulses to operate the switching equipment thereof, as is explained in detail in the above mentioned Ostline patent. Inasmuch as the pulse control relay R570 in the controller is operated at this time, a circuit is completed at the contacts 578 thereof for extending ground potential via the contacts 567 and 582 to the conductor C468X extending to the primary selector 500X and each time this circuit is interrupted and recompleted, a digit impulse is transmitted over the conductor C468X to the primary selector 500X for operating the line relay therein.

The first time that the pulse relay R580 operates and restores, it closes and opens the contacts 581 associated therewith for operating the rotary magnet RM1361 of the sender switch 1360 and at the same time opens the contacts 582 for interrupting the above traced circuit extending to the primary selector 500X. However, at this time the contacts 582 are ineffective for transmitting a digit impulse to the conductor C468X inasmuch as the contacts are shunted and ground potential is applied to the conductor C468X via the contacts 578 and 567, the conductor C675 extending to the sender switch 1360 and the home contact, the first contact and the 13th to 24th contacts, inclusive, of the contact bank associated with the wiper 1363 of the sender switch 1360, the wiper 1363 and the conductor C599 to the conductor C468X in Fig. 5. During the second operation of the pulse relay R580 the contacts 582 remain shunted and the rotary magnet RM1361 is operated to step the associated wipers into engagement with the second contacts of the associated contact banks. The next time that the pulse relay R580 operates a digit impulse is transmitted at the contacts 582 over the conductor C468X inasmuch as the conductor C599 is disconnected from the conductor C675 at the contact bank of the wiper 1363. At the same time a pulse is transmitted at the contacts 581 for operating the rotary magnet RM1361. Accordingly, the wipers of the send switch 1360 are stepped into engagement with the third contacts of the associated contact banks whereupon the wipers 1365 and 1366 begin to test the contacts thereof for negative potentials in order to determine the digit that has been registered in the register of the coder 1500 selected by the sequence switch 1350.

It being assumed in the present example that the digit 8 is marked in code form at the wipers of the send sequence switch 1350 by negative potential on the X wiper 1356, this negative potential is extended to the sixth, seventh and tenth contacts of the contact bank associated with the wiper 1365 and is extended to the third and ninth to twelfth contacts, inclusive, of the contact bank associated with the wiper 1366. The pulse relay R580 continues to transmit digit impulses over the conductor C468X at the rate of ten per second and to operate the rotary magnet RM1361 until the wipers 1365 and 1366 both step into an engagement with contacts having negative potential thereon. In the present circumstances the first such contacts are the tenth in the associated contact banks at which time 8 digit impulses have been transmitted over the conductor C468X to the primary selector 500X. When the wipers 1365 and 1366 engage the tenth contacts negative potential is extended via the conductor C676 and C674, respectively, to the digit stop relays R605 and R620 in the controller 300 whereupon the latter relays operate and close contacts 606 and 621, respectively, for extending ground potential through the winding of the digit space relay R560 to battery potential, whereupon the latter relay operates. The relay R560 upon operating completes at its contacts 565 a locking circuit for itself which extends from ground potential at the contacts 451 of the operated seizure relay 450 by way of the conductor C487 extending to Fig. 13, the contacts 1 to 24, inclusive, associated with the wiper 1364 of the sender switch 1360, the conductor C590 extending to Fig. 5, the contacts 565 and the winding of the digit space relay R560 to battery. Accordingly, once the digit space relay R560 is operated it remains operated until the wiper 1364 of the sender switch 1360 has been returned to its home position. Additionally, the digit space relay R560, upon operating, completes at its contacts 566 a circuit for bypassing the impulsing contacts 582. As a further result of the operation of the relay R560 it interrupts at the contacts 564 the circuit for operating the pulse control relay R570, whereupon the latter relay restores, and the relay R560 prepares at its contacts 563 a point in a circuit including the conductor C593 for thereafter operating the pulse control relay R570 during the automatic stepping of the sender switch 1360.

When the relay R570 restores to normal it interrupts at its contact 572 a point in the circuit for operating the magnet RM1351 of the send sequence switch 1350, whereupon the last mentioned magnet restores and advances its wipers 1353 to 1358, inclusive, from engagement with contacts 1 into engagement with contacts 2 in the associated contact banks. As a further result of the restoration of the relay R570, it completes at the contacts 571 and 573 points in a circuit extending to ground potential at the wiper 1367 of the sender switch 1360, the 10th contact of the associated contact bank, the conductors C598 extending to Fig. 5, the contacts 571, the conductors C597 extending to Fig. 13, self-interrupting contacts 1362 and the winding of the rotary magnet RM1361 to battery potential. When this circuit is completed, the rotary magnet RM1361 is operated at its self-interrupting contacts 1362 to cause the wiper to engage the next contact in the associated contact bank. This operation continues until the wipers are advanced into engagement with the contacts 13 in the associated contact bank. In this position the grounded wiper 1367 completes its circuit over the conductor C596 extending to Fig. 5, the contacts 573 and 571, the conductor C597 extending to Fig. 13, the self-interrupting contacts 1362 and the winding of the rotary magnet RM1361 to battery potential. Thereupon the rotary magnet RM1361 operates and restores in the manner as previously described and advances its wipers into engagement with the contacts 14 of the associated contact bank.

At this point a circuit is completed for extending ground potential from the wiper 1367 via the 14th contacts to the conductors C593 extending to Fig. 5, the contacts 563, the winding of the pulse control relay R570 and the resistor 579 to battery potential. Thereupon the relay R570 operates and recompletes at its contacts 577 the circuit extending via conductor C595 for operating the rotary magnet RM1361 under the control contacts 581 of the pulse relay R580. This circuit is effective for stepping the wipers of the sender switch 1360 from the 14th to 19th, inclusive, contacts thereof. When the wiper 1367 engages the 19th contacts of the associated contact bank, the above traced circuit for operating the pulse control R570 is interrupted, whereupon the rotary magnet RM1361 is operated to cause the associated wipers to engage the 20th contact of the associated contact banks. When the wiper 1367 engages the 20th contact, the previously traced self-interrupting circuit for the magnet RM1361 is recompleted whereupon the wipers of the sender switch 1360 are advanced over the contacts 20 to 24 of the associated contact banks thereof. When the wiper 1364 again engages the home contact of the associated contact bank, the locking ground potential applied to the conductor C487 for locking the digit space relay R560 in its operated position is interrupted and the relay R560 restores to normal. At this time the circuits of the register-sender 200 are prepared to transmit digit impulses corresponding to the second route digit register in the second register of the coder 1500.

It will be recalled that after the sender switch 1360 has found the contacts in the associated contact bank which are marked in accordance with the first route digit "8," the magnet RM1351 of the send sequence switch 1350 restores to normal, whereby the wipers 1353 to 1358, inclusive, thereof are stepped from the first contacts into engagement with the second contacts of the associated contact banks. Thereupon the wipers 1355 to 1358, inclusive, engage the WXYZ12 conductors of the trunk C1545 extending from the coder 1500 and assuming, as in the present example, the second register of the coder 1500 has the digit 7 registered therein, the negative potential is extended via the conductor W12, the second contacts of the contact bank associated with the W wiper 1355, the wiper 1355 and the diode D1373, the conductor C584 extending to Fig. 5, the winding of the relay R510 to battery potential at the contact 451 of the operated seizure relay R450 whereupon the relay R510 is maintained operated.

At the wiper 1353 ground potential applied to the second contacts thereof from the conductor C677 is extended over the conductor C592 in order to recomplete the previously traced circuit for operating the pulse control relay R570 and to provide the pulsing ground for the controlling of the magnet RM1361 of the sender switch 1360 to advance its wipers 1363 to 1367, inclusive, step-by-step in search for the conductors terminated at the associated contact banks having a negative potential marking thereon and designating the routing digit stored in the second register of the coder 1500. The operations of the sender switch 1360, the pulse control relay R570 and the pulse relay R580, in sending digit impulses corresponding to the routing digit "7," are the same as previously described, and it will be understood that when wipers 1365 and 1366 engage the 9th contacts in the associated contact bank the negative potential thereat is extended over the conductors C676 and C674 to operate the digit stop relays R605 and R620, whereupon the digit space relay R560 is operated to interrupt the sending of digit impulses and locks itself in the operated position over the conductor C590 until the wipers of the sender switch 1360 are stepped to their home position, as previously described.

It is understood that during the course of this stepping of the wipers 1365 and 1366 and prior to the operation of the digits space relay R560, seven digit impulses are caused to be transmitted over the conductor C468X to the primary selector 500X in order to cause the primary selector 500X to select the repeater 107 terminating the trunk extending to the distant exchange EMpire 1.

In this manner the routing digits registered in the coder 1500 are transmitted from the register-sender 200 to cause the switching apparatus in the FLorida 1 exchange to seize the trunk extending to the called exchange.

As previously pointed out, when the sender switch 1360 engage the contacts marked in accordance with the second route digit "7" the rotary magnet RM1351 of the send sequence switch 1350 is caused to restore to normal and in so doing steps the wipers 1353 to 1358, inclusive, into engagement with the third contact of the associated contact banks. Assuming, as in the present example, that the third register of the coder 1500 does not have a routing digit stored therein, no negative potential is extended to the wipers 1355 to 1358 at the third contacts of the associated contact banks, whereby the circuit extending therefrom via the associated diodes and the conductor C584 for operating the relay R510 is interrupted and the latter relay restores. Upon restoring the relay R510 completes at its contacts 514' a circuit extending from ground potential via the wiper 1354 of the send sequence switch 1350, the third contacts of the associated contact banks, the conductor C516, the contacts 514' and 636, the conductor C594 through the winding of the rotary magnet RM1351 to battery potential, whereupon the magnet RM1351 is energized but not operated at this time inasmuch as it is the operate-upon-release type. When energized the rotary magnet RM1351 closes contact 1352 for extending battery potential via the contacts 1359" of the send sequence off normal switch SSON, the resistor 1372, contacts 1352, the diode D1371 to the conductor C584 extending to winding of the relay R510 whereupon the latter relay is operated over the circuit previously traced. Upon operating the relay R510 interrupts at its contacts 514' the previously traced circuit extending via the conductor C594 for energizing the rotary magnet RM1351 whereby the latter magnet operates to cause its wipers 1353 to 1358, inclusive, to step into engagement with the fourth contacts of the associated contact banks and to interrupt at the contact 1352 the circuit for energizing the relay R510, whereupon the latter relay restores. Assuming, as in the present example, that the 4th, 5th and 6th registers of the coder 1500 do not have digits registered therein, the register-sender 200 is operated in the same manner as described above with regards to its operation relative to the 3rd register of the coder 1500, whereby the operating circuit for the rotary magnet RM1351 extended via the conductor C594 is completed and interrupted in order to cause the wipers 1353 to 1358, inclusive, to step into engagement with the 7th contacts of the associated contact banks.

The operations which now take place depend upon the operated conditions of the control relays R1575, R1580, R1585 and R1590 in the coder 1500. It will be recalled that these relays store certain controlling information transmitted thereto from the selected translator relay R1120 in the translator 1000. In the present example, the control relay R1585 has been operated and it is locked in its operated position by ground potential on the conductor C487. With the control relays in this operated condition the skip conductor C1531 extending to battery potential through the winding of the rotary magnet RM1351 and the interrupting contacts 1351 thereof, is connected only to the conductors C1537 and C1538 via the contacts 1593 and 1594, respectively, extending to the contact bank associated with the wiper 1354 of the send sequence switch 1350. The conductor C1537 is terminated at the 7th contacts of the contact banks associated with the wiper 1354 so that ground potential is exended thereover and via the conductors C1531 and the interrupting contact 1351 to energize the rotary magnet RM1351 whereupon the latter operates to cause the wipers 1353 to 1358, inclusive, to step into engagement with the 8th contacts of the associated contact banks and to skip transmission of any digits at this time. At the 8th contacts of the contact banks associated with the wiper 1354 ground potential is extended via the conductor C1538 to the conductor C1531 and the rotary magnet RM1351, whereby the latter is operated to cause the wipers 1353 to 1358, inclusive, to step into an engagement with the 9th contacts of the associated contact banks. The above described operation of the send sequence switch 1350 in stepping from engagement with the second contacts of the associated contact banks into engagement with the 9th contacts of the associated contact banks takes place during the interdigital pause which is provided after the transmission of the second route digit "7." Consequently, when the wipers of the sender switch 1360 complete the second cycle of operation and engage the home contacts of the associated contact banks, locking ground potential applied to the conductor C590 by the wiper 1364 is removed from this conductor and causes the digit space relay R560 to restore to normal.

Upon restoration of the digit space relay R560, the contacts 564 associated therewith are again closed to complete the previously traced circuit including the conductor C677 and the conductor C592 joined by the wiper 1353 and 9th contacts of the associated contact banks for operating the pulse control relay R570. The digit pulse relay R570 operates and again initiates the cycle of operation whereby the sender switch 1360 advances its wipers over the associated contact banks to transmit impulses in accordance with the value of the digit registered in the 3rd code register 1240 of the call register 1200. In the present example it is assumed that the digit 1 is stored in the 3rd code register so that battery potential is applied to the W23 and the X23 conductors extending to the contact banks associated with the wipers 1355 and 1356 of the send sequence switch 1350. Battery potential at the wipers 1355 and 1356 is extended to the 3rd contacts of the contact banks associated with the wipers 1365 and 1366 of the sender switch 1360 so that when the sender switch 1360 is operated and the wipers 1365 and 1366 engage the 3rd contacts of the associated contact banks, the digit stop relays R605 and R620 are operated in order to cause the digit space relay R560 to operate and to cause but 1 digit impulse to be transmitted to the primary selector 500X over the conductor C468X.

As previously explained, the operation of the digit space relay R560 causes the rotary magnet RM1351 to operate for stepping the associated wipers into engagement with the 10th contacts of the associated contact banks. Inasmuch as the conductors C1540 to C1543 terminated respectively at the 10th to 13th contacts, inclusive, of the contact banks associated with the wiper 1354, do not complete circuits to the skip conductor C1531, the register-sender 200 is operated in a manner as previously explained to cause the digits registered in the numerical registers 1310 to 1340 of the call register 1200 to be transmitted over the conductor C468X to primary selector 500X. As it has been assumed that the digits 1, 2, 3 and 4 are registered respectively in the numerical register 1310, 1320, 1330 and 1340, digit impulses corresponding to these digits are transmitted over the conductor C468X to the primary selector 500X.

After the sender switch 1360 has sent out the last digit registered in the 4th numerical register 1340, the sender sequence switch magnet RM1351 is operated in the manner as previously described in order to cause its wipers to advance from engagement with the 13th contacts into an engagement with the 14th contacts of the associated contact banks. When the wiper 1354 engages the 14th contact of the associated contact bank, ground potential is applied to the conductor C587 extending to Fig. 5 and then through the winding of the register-sender release relay R480 to battery potential, whereupon the latter relay is operated. The release relay R480 upon operating causes the register-sender 200 to be released from the calling connection in the manner as is described hereinafter.

*Release of the register-sender 200*

In response to the operation of the release relay R480, a hold circuit is completed for itself at contacts 486 extending from ground potential via contacts 458 of the operated seizure relay R450. At its contacts 481 ground potential is applied on the circuit for maintaining the register-sender busy relay R310 operated; at its contacts 485 locking ground is placed on the winding of the pulse generator 400; and at its contacts 482 the circuit for maintaining the hold relay R520 operated in series with relay R in the primary selector 500X is interrupted. As described in detail in the above mentioned Ostline Patent No. 2,678,353, interruption of the last named circuit causes the loop circuit extended via the conductors C471X and C472X from the register-sender hunter 450X to the code switch 890 in the register-sender to be interrupted, whereby the line relay R840 restores and interrupts at its contacts 842 the circuit for operating the hold relay R850, which relay restores a short time thereafter. The relay R850 upon restoring interrupts at its contacts 851 the circuit for applying ground potential to the conductor C837 whereby the seizure relay R450 is restored and all of the operated relays in the code switch 800 are restored.

Incident to the restoration of the seizure relay R450 there is completed at its contacts 451' a circuit extending from ground potential via the wiper 1367 of the sender switch 1360, the home contact of the associated contact bank, the conductor C495, contacts 451', a winding of the release relay R480, the conductor C496 extending to the 4th numerical register in the call register 1200 for operating all of the registers therein to their home position. Specifically, assuming that each of the registers has a digit register therein, ground potential on the conductor C496 is extended via the wiper 1343 of the register 1340, the contacts of the associated contact bank, the interrupting contact 1342 to the rotary magnet RM1341 in order to operate the rotary magnet for stepping the associated wipers to their home position whereupon the operating circuit for the magnet RM1341 is interrupted. At this time ground potential in the conductor C496 is fed via the wiper 1343 and the home contact of the associated contact bank to the third numerical register 1330 in order to cause the associated rotary magnet to step its associated wipers to the home contact position. The same operation is completed in the numerical registers 1320 and 1310, and the code register 1240, 1230 and 1220 whereby each of the registers in the call register 1200 are restored to their home positions. When the first code register 1220 has restored its associated wipers into an engagement with the home contacts, the release circuit is extended to the wiper 1213 of the receiving sequence switch 1210 in order to cause the rotary magnet RM1211 thereof to restore the associated wipers into engagement with the home contacts. The wiper 1213 in its home contact position extends the releasing ground to the send sequence switch off-normal contacts 1359' and the interrupting contacts 1351 to the rotary magnet RM1351 whereby the associated wipers 1353 to 1358 inclusive, are stepped to their home positions and the sequence switch off-normal contacts 1359' are interrupted.

The restoration of the seizure relay R450 also completes at its contacts 452' a circuit for extending ground potential on the conductor C495 via the contacts 451' and 452' to the conductor C932 extending to the code switch 800 and the vertical off normal contacts VON917 to the winding of the release magnet RM912. The release magnet RM912 is operated thereupon to cause the code switch 800 to restore the wipers 901 to 908, inclusive, to their normal positions, whereupon the vertical off normal contacts VON917 are opened and the circuit for operating the release magnet RM912 is interrupted.

As a further result of the restoration of the seizure relay R450, the various circuits completed at the contacts 452, 453, 454, 456 and 458 are interrupted to remove holding ground from the various operated relays in the controller 300, whereby all of these operated relays are restored to normal. In addition, the restored relay R450 opens its contacts 459 for removing operating ground potential from the pulse generator 400 which generator remains operated at the time from ground potential applied at the contacts 458 of the operated release relay R480.

When the wipers of the send sequence switch 1350 are stepped to their home position, ground potential applied at the wiper 1354 thereof is removed from the conductor C587, whereupon the release relay R480 is restored to normal. The relay R480 upon restoring interrupts at its contacts 485 the circuit for operating pulse generator 400 and prepares at its contacts 482 and 483 circuits for reactivating the controller portion 300 of the register-sender, and at its contacts 481 removed holding ground potential from the busy relay R310 which now restores to normal. The busy relay R310 upon restoring opens its contacts 311 for removing busy marking ground potential from the conductor C475X extending to the register-sender hunter 450X. At this time the register-sender 200 is completely restored to normal and is prepared to be seized by the register-sender hunter 450X in response to other calls initiated in the FLorida 1 exchange.

The alarm circuit of the coder 1500

The alarm circuit 1420 of the coder 1500 is operative responsive to the blowing of the fuse 1433 to render an alarm indication to an attendant in the exchange. Under normal conditions the diode D1430 in the alarm circuit 1420 is non-conductive. The anode is at substantially ground potential, the cathode is at —160 volts, and the start-electrode, which is connected to ground potential through the resistors 1431 and 1432 is biased at substantially —160 volts by a connection therefrom to the junction between the resistors 1431 and 1432. Accordingly, the potential between the start-electrode and the cathode is not sufficient to ionize the gas in the tube and to cause conduction therein. However, when the fuse 1433 is blown the start-electrode is biased at substantially ground potential so that the tube is ionized and conduction takes place between the anode and the cathode thereof. Conduction through the cold cathode tube D1430 energizes and operates the alarm relay R1440 to close the contacts 1441 for applying operating ground potential to the alarm device 1450. Thereupon the alarm device 1450 operates until the alarm relay R1440 is restored by interruption of the operating circuit therefor at the contacts 1442. As a result, the diode D1430 becomes non-conductive and upon replacement of the fuse 1433 and reclosing of the contacts 1442 the diode D1430 is non-conductive and prepared to render an alarm in the event the fuse 1433 should again break down.

Conclusions

From the foregoing it is clear that there has been described an improved register-ender arrangement including a controller, a call register and a coder circuit, wherein the coder circuit is substantially electronic in its route digit registering operation, and wherein the controller is operative through the call register and from the coder circuit for causing digit impulses corresponding to the routing digits stored in the coder circuit and certain of the dialed digits stored in the call register to be transmitted to the switching apparatus in the exchange.

While there has been described what is at present considered to be a preferred embodiment of the invention, it will be understood that various modifications may be made therein, and it is intended to cover in the appended claims all such modifications as fall within the true spirit and scope of the invention.

What is claimed is:

1. In a telephone exchange including a plurality of calling stations, switching apparatus selectively operative for extending a connection to any one of a number of other exchanges each identified by an individual group of exchange digits, and a translator selectively operative in accordance with exchange digits transmitted from any one of said calling stations for translating said group of exchange digits to a corresponding set of routing digits; a register-sender combination comprising a route register including a plurality of individual registers corresponding to the routing digits of said set, each of said individual registers being provided with a group of diodic discharge devices and a corresponding group of associated incoming conductors and a corresponding group of associated outgoing conductors, a send switch having digits consecutively marked thereto and selectively operative in order to cause control impulses corresponding to each of the digits marked thereto to be transmitted for operating said switching apparatus, a sequence switch associated with said send switch selectively operative for consecutively connecting said groups of outgoing conductors to said send switch in order consecutively to mark the routing digits registered in the individual registers of said routing register to said send switch, a controller responsive to the dialing of a group of exchange digits at any one of said calling stations for rendering the discharge devices of said routing register operative and for operating said sequence switch to connect one group of said outgoing conductors to said send switch and for seizing said translator to said register-sender and to said groups of incoming conductors therein in order to translate said group of exchange digits to a corresponding set of routing digits and to mark each group of incoming conductors in accordance with a corresponding individual routing digit of said set, thereby to discharge each group of diodic discharge devices in accordance with the markings of the corresponding group of incoming conductors in order to register the corresponding individual routing digit and to mark the corresponding group of outgoing conductors in accordance with the registered routing digit, whereby said send switch has a digit marked thereto via said one connected group of outgoing conductors, a control switch included in said controller responsive to said send switch having a digit marked thereto for releasing said translator from said register-sender and from said groups of incoming conductors and for operating said sender switch to cause a group of control pulses corresponding to said digit to be transmitted to said switching apparatus, and means included in said controller operated from said send switch responsive to the transmission therefrom of control pulses corresponding to said digit marked thereto for restoring said send switch to normal and for operating said sequence switch to connect another of said groups of outgoing conductors to said send switch in order to mark another digit thereto and for thereafter reoperating said send switch, whereby groups of control pulses corresponding to the digits registered in said routing register are consecutively transmitted to said switching apparatus.

2. In a telephone exchange including a plurality of calling stations, switching apparatus selectively operative for extending a connection to any one of a number of other exchanges each identified by an individual group of exchange digits, and a translator selectively operative in accordance with exchange digits transmitted from any one of said calling stations for translating said group of exchange digits to a corresponding set of routing digits; a register-sender combination comprising a route register including a plurality of individual registers corresponding to the routing digits of said set, each of said individual registers being provided with a group of discharge devices and a corresponding group of incoming conductors and a corresponding group of outgoing conductors wherein each of said discharge devices includes an anode terminating the corresponding outgoing conductor and a start electrode terminating the corresponding incoming conductor and a cathode, a send switch having digits individually marked thereto and selectively operative in order to cause a group of control impulses corresponding to each of the digits marked thereto to be transmitted for operating said switching apparatus, a sequence switch associated with said send switch selectively operative for consecutively connecting said groups of outgoing conductors to said send switch in order consecutively to mark the routing digits registered in the individual registers of said routing register to said send switch, a controller responsive to the dialing of a group of exchange digits at any one of said calling stations for biasing said each of said discharge devices for conduction between the anode and cathode thereof and for operating said sequence switch to connect a first group of said outgoing conductors to said send switch and for seizing said translator to said register-sender and to said groups of incoming conductors therein in order to translate said group of exchange digits to a corresponding set of routing digits and selectively to apply a marking potential to incoming conductors of each of said groups in accordance with the corresponding individual routing digits of said set, said marking potentials on said incoming conductors causing a discharge in each of the corresponding discharge devices between the start-electrode and cathode thereof in order to render said discharge devices conductive in the anode-cathode path thereof thereby to register said routing digits in said individual registers and to mark the groups of outgoing conductors in accordance with said registered routing digits, whereby said send switch has a digit marked thereto via said one connected group of outgoing conductors, a control switch included in said controller responsive to said send switch having a digit marked thereto for releasing said translator from said register-sender and from said groups of incoming conductors and for operating said sender switch to cause a group of control pulses corresponding to said digit to be transmitted to said switching apparatus, and means included in said controller operated from said send switch responsive to the transmission therefrom of control pulses corresponding to said digit marked thereto for restoring said send switch to normal and for operating said sequence switch to connect another of said groups of outgoing conductors to said send switch in order to mark another digit thereto and for thereafter reoperating said send switch, whereby groups of control pulses corresponding to the digits registered in said routing register are consecutively transmitted to said switching apparatus.

3. In a telephone exchange including a plurality of calling stations, switching apparatus selectively operative for extending a connection to any one of a number of other exchanges each identified by an individual group of exchange digits, and a translator selectively operative in accordance with exchange digits transmitted from any one of said calling stations for translating said group of exchange digits to a corresponding set of routing digits; a register-sender combination comprising a route register including a plurality of individual registers corresponding to the routing digits of said set, each of said individual registers being provided with a group of discharge devices and a corresponding group of incoming conductors and a corresponding group of outgoing conductors wherein each of said discharge devices includes an anode terminating the corresponding outgoing conductor and a start electrode terminating the corresponding incoming conductor and a cathode, a pulse transmitter selectively operative for sending control pulses to operate said switching apparatus, a send switch having digits individually marked thereto and operative from said pulse transmitter conjointly with the sending operation thereof to count the control pulses sent thereby, a sequence switch associated with said send switch selectively operative through a cycle for consecutively connecting said groups of outgoing conductors to said send switch in order consecutively to mark the routing digits registered in the individual registers of said routing register to said send switch, a controller responsive to the dialing of a group of exchange digits at any one of said calling stations for biasing said each of said discharge devices for conduction between the anode and cathode thereof and for operating said sequence switch to connect a first group of said outgoing conductors to said send switch and for seizing said translator to said register-sender and to said groups of incoming conductors therein in order to translate said groups of exchange digits to a corresponding set of routing digits and selectively to apply a marking potential to incoming conductors of each of said groups in accordance with the corresponding individual routing digits of said set, said marking potentials on said incoming conductors causing a discharge in each of the corresponding discharge devices between the start-electrode and cathode thereof in order to render said discharge devices conductive in the anode-cathode path thereof thereby to register said routing digits in said individual registers and to mark the groups of outgoing conductors in accordance with said registered routing digits, whereby said send switch has a digit marked thereto via said one connected group of outgoing conductors, a control switch included in said controller responsive to said send switch having a digit marked thereto for releasing said translator from said register-sender and from said groups of incoming conductors and for initiating operation of said pulse transmitter, and means included in said controller operated from said send switch responsive to a control pulse count thereat corresponding to the digit marked thereto for interrupting operation of said pulse transmitter and for operating said sequence switch to connect another group of outgoing conductors to said send switch in order to mark another digit thereto and for reoperating said pulse transmitter and operated from said sequence switch responsive to the operation thereof through one complete cycle for restoring said pulse transmitter and for operating said sequency switch to its normal position, whereby groups of control pulses corresponding to the routing digits registered in said routing register are transmitted to operate said switching apparatus.

4. In a telephone exchange including a plurality of calling stations, switching apparatus selectively operative for extending a connection to any one of a number of other exchanges each identified by an individual group of exchange digits, and a translator selectively operative in accordance with exchange digits transmitted from any one of said calling stations for translating said group of exchange digits to a corresponding set of routing digits; a register-sender combination comprising a route register including a plurality of individual registers corresponding to routing digits of said set, each of said individual registers being provided with a group of four discharge devices and a corresponding group of four incoming conductors and a corresponding group of four outgoing conductors wherein each of said discharge devices includes an anode terminating the corresponding outgoing conductor and a start electrode terminating the corresponding incoming conductor and a cathode, a send switch having digits individually marked thereto on a numerical basis and selectively operative in cycles in order to cause a group of control impulses corresponding to each of the digits marked thereto to be transmitted for operating said switching apparatus, a sequence switch associated with said send switch selectively operative through a cycle for consecutively connecting said groups of outgoing conductors to said send switch in order consecutively to mark the routing digits registered in the individual registers of said routing register to said send switch on a numerical basis, a controller responsive to the transmission of a group of exchange digits from any one of said calling stations for biasing each of said discharge devices for conduction between the anode and cathode thereof and for operating said sequence switch to connect a first group of said outgoing conductors to said send switch and for seizing said translator to said register-sender and to said groups of incoming conductors therein in order to translate said group of exchange digits to a corresponding set of routing digits and selectively to apply a marking potential to one or two of the incoming conductors of each of said groups in accordance with the corresponding individual routing digits of said set in order to mark said set of routing digits to said groups of incoming conductors in code form, said marking potentials on said incoming conductors causing a discharge in each of the corresponding discharge devices between the starter-electrode and cathode thereof in order to render said discharge devices conductive in the anode-cathode path thereof thereby to register said routing digits in said individual registers and to mark the groups of outgoing conductors in accordance with said registered routing digits, whereby said send switch has a digit marked thereto via said one connected group of outgoing conductors, a control switch included in said controller responsive to said send switch having a digit marked thereto for releasing said translator from said register-sender and from said groups of incoming conductors and for operating said sender switch to cause a group of control pulses corresponding to said digit to be transmitted to said switching apparatus, and means included in said controller operated from said send switch responsive to the transmission therefrom of control pulses corresponding to said digit marked thereto for restoring said send switch to normal and for operating said sequence switch to connect another group of outgoing conductors to said send switch in order to mark another digit thereto and for thereafter reoperating said send switch, whereby groups of control pulses corresponding to the digits registered in said routing register are transmitted to said switching apparatus.

5. In a telephone exchange including a plurality of calling stations, switching apparatus selectively operative for extending a connection to any one of a number of other exchanges each identified by an individual group of exchange digits, and a translator selectively operative in accordance with exchange digits transmitted from any one of said calling stations for translating said group of exchange digits to a corresponding set of routing digits; a register-sender combination comprising a route register including a plurality of individual registers corresponding at least to the number of routing digits in a set thereof, each of said individual registers being provided with a group of diodic discharge devices and a corresponding group of associated incoming conductors and a corresponding group of associated outgoing conductors, a send switch having digits individually marked thereto on a numerical basis and selectively operative in cycles in order to cause a group of control impulses corresponding to each of the digits marked thereto to be transmitted for operating said switching apparatus, a sequence switch having a plurality of switch positions corresponding to said plurality of individual registers terminating the associated groups of outgoing conductors and a home position and a terminus position and selectively operative from said home position through said switch positions to said terminus position for connecting each group of outgoing conductors to said send switch in order to mark thereto the routing digits registered in said individual registers, a controller responsive to the transmission of a group of exchange digits from any one of said calling stations for rendering the discharge devices of said routing register operative and for operating said sequence switch from said home position to a first switch position and for seizing said translator to said register-sender and to said groups of incoming conductors therein in order to translate said group of exchange digits to a corresponding set of routing digits and selectively to mark individual incoming conductors of each of said groups in accordance with the corresponding individual routing digits of said set, in order to discharge corresponding ones of said discharge devices thereby to register the routing digits and to mark the individual outgoing conductors of each of said groups in accordance with the correspondingly registered routing digits, whereby said send switch has a digit marked thereto via said sequence switch and the one group of outgoing conductors terminated at the first switch position thereof, a control relay included in said controller operated from said sequence switch responsive to a digit marked to the first switch position thereof for operating said sender switch to cause a group of control pulses corresponding to said digit to be transmitted to said switching apparatus and for preparing an auxiliary circuit for stepping said sequence switch and restored thereafter responsive to the absence of digit markings at the engaged sequence switch position for completing said auxiliary circuit to step said sequence switch to its next position and to reoperate said control relay, and means included in said controller controlled from said send switch responsive to the transmission therefrom of control pulses corresponding to said digit marked thereto for operating said sequence switch from its engaged switch position to its next position and for operating said send switch through another sending cycle and controlled from said sequence switch responsive to the engagement thereat of its terminus position for operating said sequence switch to its home position and for restoring the operated portions of said register-sender, whereby groups of control pulses corresponding to the digits registered in said routing register are transmitted to said switching apparatus.

6. In a telephone exchange including a plurality of calling stations, switching apparatus selectively operative for extending a connection to any one of a number of other exchanges each identified by an individual group of exchange digits, and a translator selectively operative in accordance with exchange digits transmitted from any one of said calling stations for translating said group of exchange digits to a corresponding set of routing digits; a register-sender combination comprising a route register including a plurality of individual registers corresponding at least to the number of routing digits in a set thereof, each of said individual registers being provided with a group of four discharge devices and a corresponding group of four incoming conductors and a corresponding group of four outgoing conductors wherein each of said discharge devices includes an anode terminating the corresponding outgoing conductor and a start-electrode terminating the corresponding incoming conductor and a cathode, a send switch having digits marked thereto on a numerical basis and selectively operative in cycles in order to cause a group of control impulses corresponding to each of the digits marked thereto to be transmitted for operating said switching apparatus, a sequence switch having a plurality of switch positions corresponding to said plurality of individual registers and terminating the associated groups of outgoing conductors and having a home position and a terminus position and selectively operative from said home position through said switch position to said terminus position for connecting each group of outgoing conductors to said send switch in order to mark thereto the routing digits registered in said individual registers, a source of potential provided with a high voltage terminal and a low voltage terminal, a controller responsive to the transmission of a group of exchange digits from any one of said calling stations for applying said low potential to the cathode and said high potential to the anode of each diodic device in order to render said devices operative and for operating said sequence switch from said home position to a first switch position and for seizing said translator to said register-sender and to said groups of incoming conductors therein in order to translate said group of exchange digits to a a corresponding set of routing digits and selectively to mark the incoming conductors of each of said groups with said low voltage in accordance with the corresponding individual routing digits of said set; whereupon in each of the corrresponding individual registers ones of said discharge devices corresponding to the marked incoming conductors are discharged and rendered conductive to register the corresponding digit and to mark the outgoing conductors of the associated group in accordance with the routing digit registered therein, whereby said send switch has a digit marked thereto via said sequence switch and the one group of outgoing conductors terminated at the first switch position thereof, a control relay included in said controller operated from said sequence switch responsive to a digit marked to the first switch position thereof for operating said sender switch to cause control pulses corresponding to said digit to be transmitted to said switching apparatus and for preparing an auxiliary circuit for stepping said sequence switch and restored thereafter responsive to the absence of digit markings at the engaged sequence switch position for completing said auxiliary circuit to step said sequence switch to its next position and to reoperate said control relay, and means included in said controller controlled from said send switch responsive to the transmission therefrom of a group of control pulses corresponding to the digit marked thereto for operating said sequence switch from its engaged switch position to its next position and for operating said send switch through another sending cycle and controlled from said sequence switch responsive to the engagement thereat of its terminus position for operating said sequence switch to its home position and for restoring the operated portions of said register-sender, whereby groups of control pulses corresponding to the digits registered in said routing register are transmitted to said switching apparatus.

7. In a telephone exchange including a plurality of calling stations, switching apparatus selectively operative for extending a connection to any one of a number of other exchanges each identified by an individual group of exchange digits, and a translator selectively operative in accordance with exchange digits transmitted from any one of said calling stations for translating said group of exchange digits to a corresponding set of routing digits; a register-sender combination comprising a route register including a plurality of individual registers corresponding at least to the number of routing digits in a set thereof, each of said individual registers being provided with a group of four discharge devices and a corresponding group of four incoming conductors and a corresponding group of four outgoing conductors wherein each of said discharge devices includes an anode terminating the corresponding outgoing conductor and a start-electrode terminating the corresponding incoming conductor and a cathode, a pulse transmitter selectively operative for sending control pulses to operate said switching apparatus, a send switch having digits marked thereto on a numerical basis and operative from said pulse transmitter conjointly with the sending operation thereof to count the control pulses sent thereby, a sequence switch having a plurality of switch positions corresponding to said plurality of individual registers terminating the associated groups of outgoing conductors and having a home position and a terminus position and selectively operative from said home position through said switch positions to said terminus position for connecting each group of outgoing conductors to said switch in order to mark thereto the routing digits registered in said individual registers, a source of potential provided with a high voltage terminal and a low voltage terminal, a controller responsive to the transmission of a group of exchange digits from any one of said calling stations for applying said low potential to the cathode and said high potential to the anode of each device in order to render said devices operative and for operating said sequence switch from said home position to a first switch position and for seizing said translator to said register-sender and to said groups of incoming conductors therein in order to translate said group of exchange digits to a corresponding set of routing digits and selectively to mark individual ones of said groups of incoming conductors with said low voltage and in accordance with the individual routing digits of said set, whereupon in each of the corresponding individual registers ones of said discharge devices corresponding to the marked incoming conductors are discharged and rendered conductive thereby to register the corresponding digit and to mark the outgoing conductors of the associated group in accordance with the routing digit registered therein, a control relay included in said controller responsive to said send switch having a digit marked thereto for initiating operation of said pulse transmitter and for preparing an auxiliary circuit for stepping said sequence switch and restored thereafter responsive to the absence of digit markings at the engaged sequence switch position for completing said auxiliary circuit to step said sequence switch to its next position and to reoperate said control relay, and means included in said controller operated from said send switch responsive to a control pulse count thereat corresponding to the digit marked thereto for interrupting operation of said pulse transmitter and for stepping said sequence switch to engage another group of outgoing conductors and for reoperating said pulse transmitter and operated from said sequence switch responsive to the stepping thereof to its terminus position for restoring said pulse transmitter and for stepping said sequence switch to its home position, whereby groups of control pulses corresponding to the digits registered in said routing register are transmitted to said switching apparatus.

8. The register-sender combination set forth in claim 7, further comprising a current limiting fuse in said connection between said low voltage terminal and the cathodes of said discharge devices and an alarm circuit responsive to the failure of said current limiting fuse; said alarm circuit comprising an alarm relay, a resistive load, and a further discharge device including an anode connected to said high voltage terminal through the winding of said alarm relay and a cathode connected to the junction between said low voltage terminal and said fuse and a start-electrode connected to said high voltage terminal through said resistive load, said resistive load being further connected at its mid-point and via said fuse to the cathode of said further discharge device, so that within the normal current conductive range of said fuse said further discharge device is non-conductive and upon failure of said fuse said further discharge device is discharged between the start electrode and cathode thereof and becomes conductive in a path extending from said high voltage terminal to said low voltage terminal through the winding of said alarm relay and the anode-cathode of said further discharge device, whereby said alarm relay is operated and an alarm signal rendered.

<center>No references cited.</center>